US008289849B2

(12) United States Patent
Ribeiro et al.

(10) Patent No.: US 8,289,849 B2
(45) Date of Patent: Oct. 16, 2012

(54) PROTOCOL WITH IMPROVED SPATIAL REUSE

(75) Inventors: Cássio Barboza Ribeiro, Espoo (FI); Olav Tirkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 287 days.

(21) Appl. No.: 12/720,288

(22) Filed: Mar. 9, 2010

(65) Prior Publication Data

US 2011/0222398 A1     Sep. 15, 2011

(51) Int. Cl.
*G01R 31/08* (2006.01)
(52) U.S. Cl. .......................................... 370/230; 370/252
(58) Field of Classification Search ........................ None
See application file for complete search history.

(56) References Cited

U.S. PATENT DOCUMENTS

| | | | |
|---|---|---|---|
| 2002/0003807 A1 | 1/2002 | Amit et al. | |
| 2005/0180357 A1* | 8/2005 | Tao et al. ....................... | 370/329 |
| 2008/0039046 A1* | 2/2008 | Vilzmann et al. .............. | 455/296 |
| 2008/0064431 A1* | 3/2008 | Zangi ............................. | 455/522 |
| 2008/0144493 A1* | 6/2008 | Yeh ................................ | 370/230 |
| 2009/0129366 A1* | 5/2009 | Molisch et al. ................ | 370/347 |
| 2009/0135769 A1 | 5/2009 | Sambhwani et al. | |
| 2009/0147893 A1* | 6/2009 | Takahashi et al. ............. | 375/346 |
| 2010/0022261 A1* | 1/2010 | Meier et al. .................... | 455/500 |
| 2010/0027490 A1 | 2/2010 | Mazet et al. | |
| 2010/0329131 A1* | 12/2010 | Oyman et al. ................. | 370/252 |

FOREIGN PATENT DOCUMENTS

EP     1 845 669 A1     10/2007

OTHER PUBLICATIONS

Murad Abusubaih, et al., "Collaborative Setting of RTS/CTS in Multi-Rate Multi-Cell IEEE 802.11 Wireless LANs", Sep. 2008, pp. 1-7, http://www.eu-mesh.eu/files/publications/IEEELANMAN_Abusubaih.pdf.
João Luis Sobrinho, et al., "Why RTS-CTS is not your ideal wireless LAN multiple access protocol", in Proc. of the IEEE Wireless Communications and Networking Conference, Mar. 2005.
S. Kim et al., "Design and Theoretical Analysis of Throughput Enhanced Spatial Reuse Distributed Coordination Function for IEEE 802.11", IET Commun., vol. 3, Iss. 12, 2009, pp. 1934-1947.
International Search Report application No. PCT/FI2011/050030 dated Apr. 19, 2011.

* cited by examiner

*Primary Examiner* — David Oveissi
(74) *Attorney, Agent, or Firm* — Squire Sanders (US) LLP

(57) ABSTRACT

According to an embodiment, a method, apparatus, and computer readable medium can provide an efficient mechanism to improve data rates of nodes suffering high interference without sacrificing performance of nodes that do not need interference-free channels to communicate. A node can receive two or more RTS packets and identify the RTS packet corresponding to its own cell, as well as RTS packets belonging to interferers. Based on the interference level estimated from the RTS packets, the node can decide if the channel needs to be interference-free for the intended transmission or if the current level of interference is acceptable. According to the embodiment, there can be two or more different types of CTS packets. A node can decide which type of CTS packet to transmit based on the information, signal level, interference level, or a combination therein, of at least two RTS channels, and based on measurements performed on these RTS channels, or other channels.

24 Claims, 15 Drawing Sheets

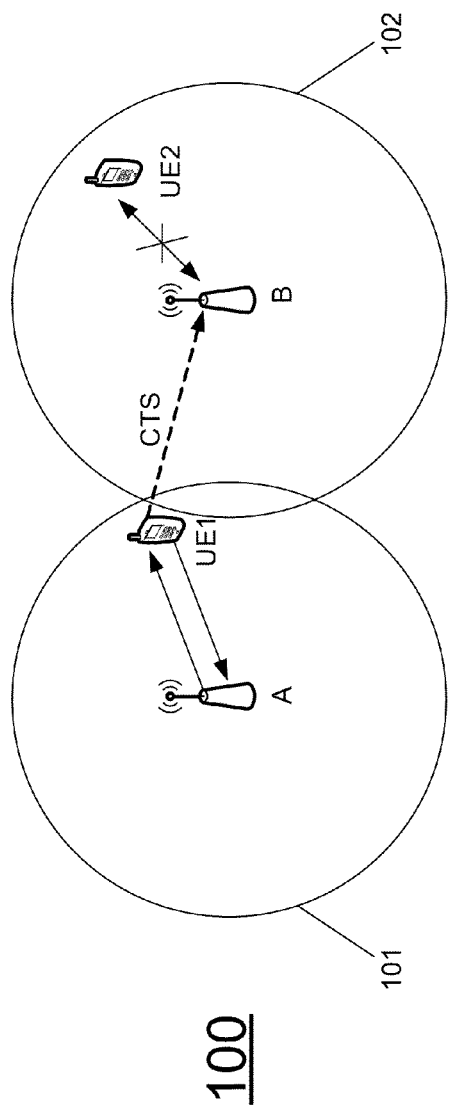
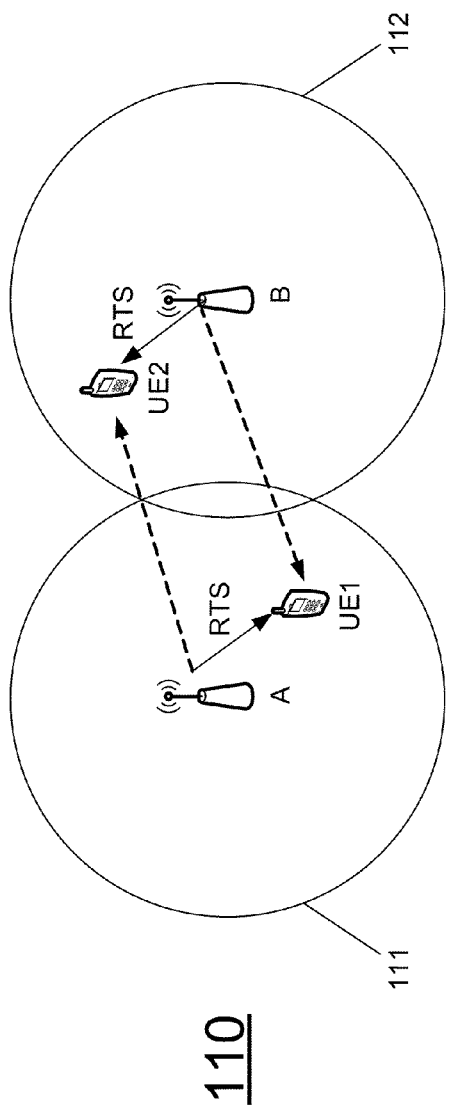
Fig. 1A (Prior Art)
Fig. 1B (Prior Art)

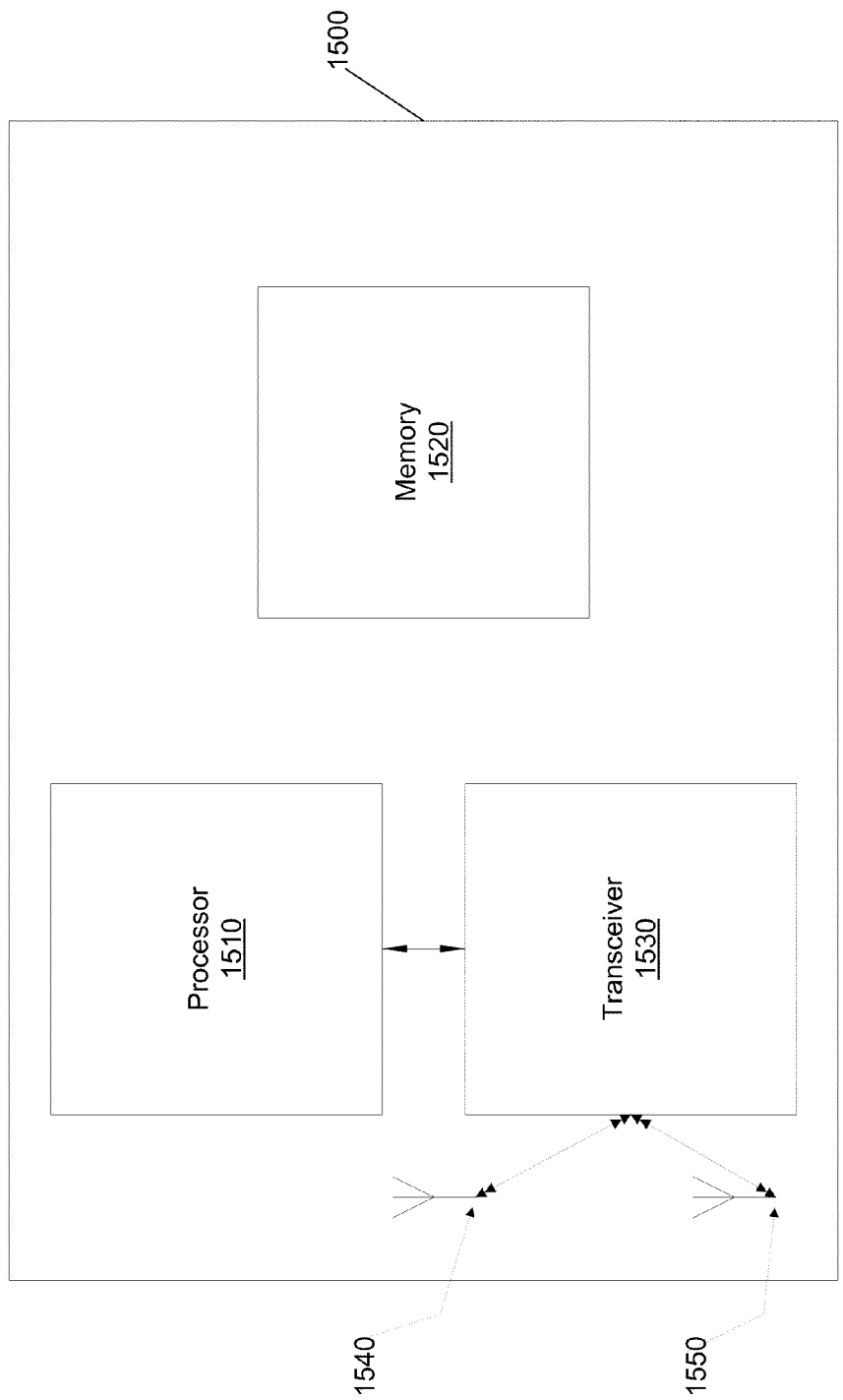

PROTOCOL WITH IMPROVED SPATIAL REUSE

BACKGROUND

1. Field

Certain embodiments of the invention relate generally to communication systems, and more particularly, to wide area cellular communication systems such as Global System for Mobile Communications (GSM), Universal Mobile Telecommunications System (UMTS), High Speed Packet Access (HSPA), and Third Generation Partnership Project (3GPP) Long-Term Evolution (LTE).

2. Description of the Related Art

Currently, there are efforts to design a local area radio system to complement existing cellular wide area systems, such as GSM, UMTS, HSPA, and LTE. Unlike a wide area cellular system, a local area system can utilize a license-exempt spectrum, or white spaces, to take advantage of additional bandwidth. In addition, a local area system can offer an efficient device-to-device operation mode to establish ad-hoc networks.

A radio interface of this local area system is derived from state-of-the-art radio designed in 3GPP LTE-Advanced (LTE-A) standardization. However, uncoordinated deployments and dynamic time division duplex (TDD) switching points are likely to be used in the local area system. The use of uncoordinated deployments and dynamic TDD switching points can result in high-interference scenarios, where there is an increased likelihood of data packet transmission collisions, because of simultaneous data packet transmissions. For example, interference can be high for data packet transmissions, in situations such as terminals in cell edges or uncoordinated deployments.

One particular interference scenario is identified as a "hidden node problem." A hidden node in a cellular wide area system (or local area system) refers to a node of the system that is out of range of another node or a collection of nodes, where a node is a device connected to the cellular system (such as a user equipment (UE)). For example, node A may reside at a far edge of an access point's (AP's) range, and node B may reside at an opposite edge of the AP's range, where an AP is a device that allows a node to connect to the cellular system. For example, an AP may be an evolved Node B (eNB). Both node A and node B can sense the presence of, and transmit packets to, the AP. However, node A cannot sense the presence of node B, as node B is outside of node A's range, and visa-versa. Thus, node B is hidden to node A, and visa-versa. In the hidden node problem, nodes A and B simultaneously transmit packets to the AP because nodes A and B cannot sense each other, and thus, cannot determine that the other node is also transmitting a packet to the AP. The simultaneous transmission of packets to the AP causes collisions, which scrambles data packets.

In IEEE 802.11 standard, a Request-to-Send (RTS)/Clear-to-Send (CTS) protocol is an optional feature that attempts to solve the hidden node problem. According to the RTS/CTS protocol, an origination node that desires to transmit a packet to a destination node first transmits an RTS packet. The destination node replies with a CTS packet. Any other node that receives the RTS packet or CTS packet is required to refrain from transmitting packets until the transmission between the origination node and destination node has completed. In effect, the RTS/CTS protocol allows a node to reserve a channel in order to transmit data packets. Thus, the RTS/CTS protocol solves the hidden node problem, and provides for essentially interference-free transmissions. While RTS/CTS protocol is an example of a protocol that utilizes a handshake mechanism in order to transmit packets, other protocols exist as well that utilize a handshake mechanism.

FIG. 1A illustrates an example of a conventional RTS/CTS protocol exchange for a channel reservation. As illustrated in FIG. 1A, cellular system 100 includes APs A and B, and UE1 and UE2. AP A is located at the center of cell 101, and AP B is located at the center of cell 102. UE1 is a cell-edge user, as UE1 is located near the edge of cell 101, while still being within cell 101, and near the edge of cell 102. As illustrated in FIG. 1A, in accordance with the RTS/CTS protocol, before AP A and UE1 transmit data packets to one another, UE1 transmits a CTS packet to AP B, which is in range of UE1. Upon receiving the CTS packet, AP B refrains from transmitting to UE2, which allows AP A and UE1 to complete their transmission. Thus, a cell-edge user has an advantage of an essentially interference-free channel, leading to a small probability of transmission outage. This property makes the RTS/CTS protocol attractive for a multi-cell environment with a quality-of-service (QoS) target where a minimum guaranteed data rate is supported.

However, there can be several shortcomings in the application of the RTS/CTS protocol, particularly in conjunction with a carrier sense multiple access (CSMA) protocol, which can result in rate degradation in the system. First, the RTS/CTS protocol can lead to an inefficient utilization of resources, since channels cannot be reused between terminals, where the data packet transmission can tolerate a level of interference. In other words, the RTS/CTS protocol assumes that all data packet transmissions require an interference-free environment to be successful. If this is not the case, then data packet transmissions that would otherwise be successful are not allowed by the RTS/CTS protocol.

FIG. 1B illustrates an example of a direct application of the conventional RTS/CTS protocol, where data packet transmissions are inhibited, even though the transmissions would otherwise be successful. As illustrated in FIG. 1B, cellular system 110 includes APs A and B, and UE1 and UE2. AP A is located at the center of cell 111, and AP B is located at the center of cell 112. In FIG. 1B, both UE1 and UE2 simultaneously receive two RTS packets. According to the RTS/CTS protocol, UE1 fails to acknowledge AP A, and UE2 fails to acknowledge AP B, and thus, data packet communication is inhibited. However, in this scenario, a reasonable data rate between AP A and UE1, and a reasonable data rate between AP B and UE2, could be achieved using techniques such as link adaptation, despite the presence of interference. For example, a cellular system, such as a 3GPP LTE cellular system, can employ a link adaptation mechanism to adjust a data rate for each UE in such a way that some level of interference can be tolerated in the system, and thus, resources can be reused efficiently. However, because the RTS/CTS protocol assumes that all data packet transmissions require an interference-free environment to be successful, such efficient resource use is lost.

Second, the RTS/CTS protocol does not prevent all scenarios where a node interferes with a neighboring transmission and causes packets to collide. FIG. 2 illustrates examples of possible types of collisions that can occur with a conventional RTS/CTS protocol. In sequence 200, AP A transmits packet RTS (A) UE A, and AP B simultaneously transmit packet RTS (B) to user UE A. Because packet RTS (A) and packet RTS (B) arrive at UE A simultaneously, the packets collide, and UE A cannot decode the contents of the packet. This is known as RTS collision. Due to RTS collision, UE A does not transmit packet CTS (A) to AP A or AP B. Because AP A does not receive packet CTS (A), AP A fails to transmit data packet Tx A to UE A. Furthermore, due to the collision of packets RTS (A) and RTS (B), UE A does not forward packet RTS (A) to UE B. Because UE B does not receive packet RTS (A), UE B transmits packet CTS (B) to AP B. Upon receiving packet CTS (B), AP B transmits data packet Tx B to UE B.

Furthermore, in sequence 210, AP A transmits a packet RTS (A), and AP B transmits a packet RTS (B). UE A receives packet RTS (A), but does not receive packet RTS (B) due to packet loss (such as signal degradation over the system, an oversaturated channel, a corruption of the packet RTS (B) causing the packet to be rejected in-transit, or a underlying hardware problem). Because UE A only receives packet RTS (A), and does not receive packet RTS (B), UE A transmits packet CTS (A) to APs A and B. Furthermore, because UE B receives packet RTS (B), UE B transmits packet CTS (B) to AP B. In this case, there is a collision between packet CTS (A) and packet CTS (B) at AP B, and thus, AP B does not transmit data packet Tx B.

SUMMARY

According to an embodiment of the invention, a method includes receiving two or more packets. The method further includes decoding the two or more packets, and applying a collision resolution to the two or more packets to decide whether to transmit a data packet. The method further includes transmitting the data packet based on a result of the collision resolution.

According to another embodiment, a method includes receiving two or more first packets, and decoding the two or more first packets. The method further includes applying a collision resolution to the two or more first packets to decide what type of second packet to transmit, and transmitting a second packet based on the collision resolution.

According to another embodiment, an apparatus includes a processor, and a memory including computer program code. The memory and the computer program code are configured to, with the processor, cause the apparatus to receive two or more packets. The memory and the computer program code are further configured to, with the processor, cause the apparatus to decode the two or more packets, and apply a collision resolution to the two or more packets to decide whether to transmit a data packet. The memory and the computer program code are further configured to, with the processor, cause the apparatus to transmit the data packet based on a result of the collision resolution.

According to another embodiment, an apparatus includes a processor, and a memory including computer program code. The memory and the computer program code are configured to, with the processor, cause the apparatus to receive two or more first packets, and decode the two or more first packets. The memory and the computer program code are further configured to, with the processor, cause the apparatus to apply a collision resolution to the two or more first packets to decide what type of second packet to transmit, and transmit a second packet type based on the collision resolution.

According to another embodiment, a computer readable medium having a computer program stored thereon that, when executed by a processor, causes the processor to implement a method. The method includes receiving two or more packets. The method further includes decoding the two or more packets, and applying a collision resolution to the two or more packets to decide whether to transmit a data packet. The method further includes transmitting the data packet based on a result of the collision resolution.

According to another embodiment, a computer readable medium having a computer program stored thereon that, when executed by a processor, causes the processor to implement a method. The method includes receiving two or more first packets, and decoding the two or more first packets. The method further includes applying a collision resolution to the two or more first packets to decide what type of second packet to transmit, and transmitting a second packet based on the collision resolution.

BRIEF DESCRIPTION OF THE DRAWINGS

Further embodiments, details, advantages, and modifications of the present invention will become apparent from the following detailed description of the preferred embodiments, which is to be taken in conjunction with the accompanying drawings, wherein:

FIG. 1A illustrates an example of a conventional RTS/CTS protocol exchange for a channel reservation.

FIG. 1B illustrates an example of a direct application of the conventional RTS/CTS protocol.

FIG. 15 illustrates an apparatus according to another embodiment of the invention.

DETAILED DESCRIPTION

Figure 2:
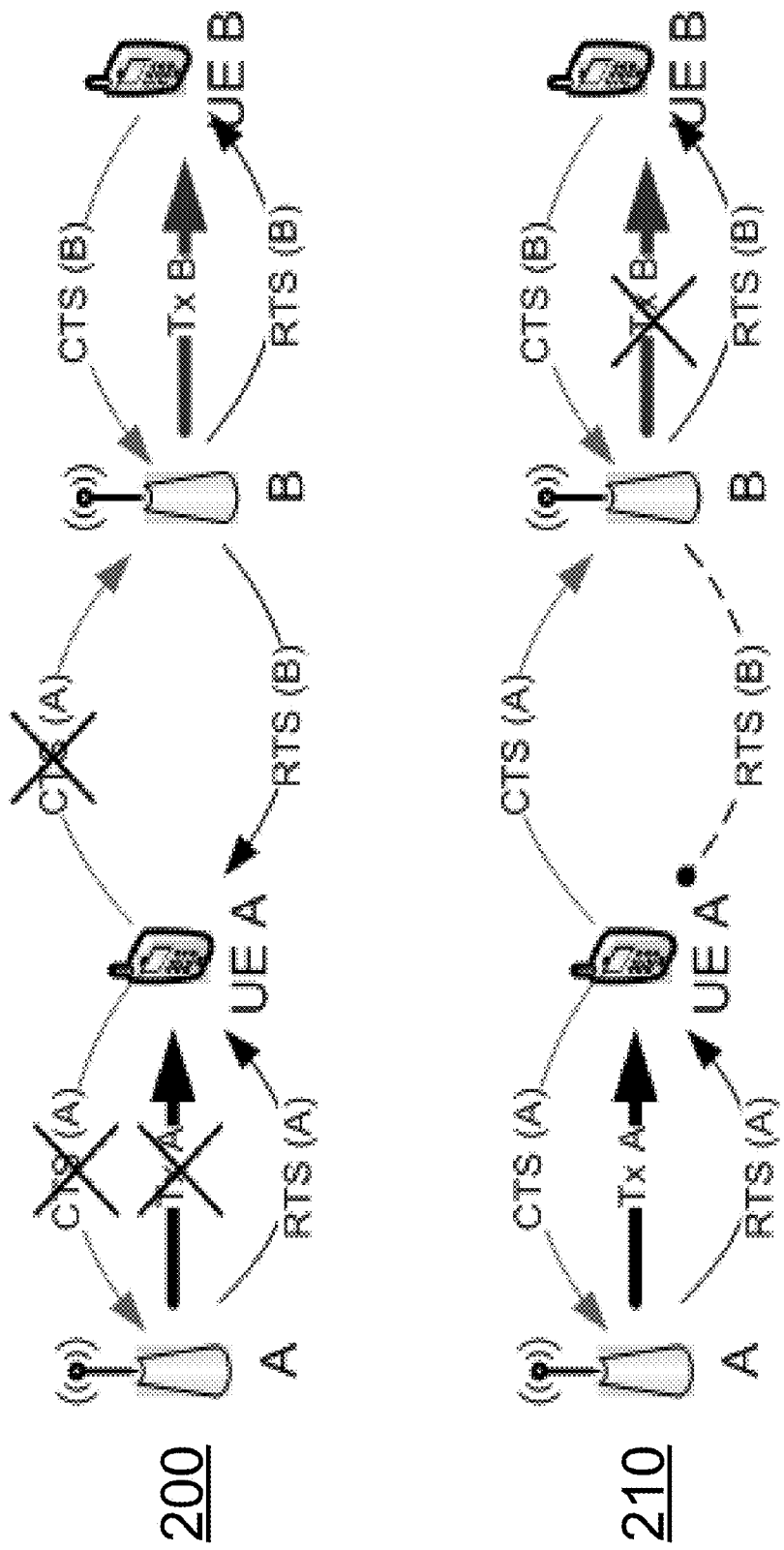
FIG. 2 illustrates examples of possible types of collisions that can occur with a conventional RTS/CTS protocol.

It will be readily understood that the components of the present invention, as generally described and illustrated in the figures herein, may be arranged and designed in a wide variety of different configurations. Thus, the following detailed description of the embodiments of a method, apparatus, system, and computer readable medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "certain embodiments,"

"some embodiments," "different embodiments" or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," "in different embodiments," or other similar language, throughout this specification do not necessarily all refer to the same group of embodiments, and the described features, structures, or characteristics may be combined in any suitable manner in one or more embodiments.

A "cell" is defined as a set of transmitter-receiver nodes that primarily are configured to communicate with each other. Thus, a cell includes a traditional cell of cellular communications, as well as an AP and the clients it serves, a device-to-device communication pair, or a cluster in an ad-hoc network. In FIGS. 3-10, the transmitters are depicted as APs with a name "X," and the receivers are depicted as UEs with a name "UE X." This nomenclature is merely used to describe example embodiments of the invention, and is not intended to restrict the scope of the invention, as any possible transmitter-receiver pairs involved in point-to-point communication may be used. In addition, there may be multiple receivers for a given transmission, at least one of which participates in the RTS/CTS handshake.

As previously discussed there can be several shortcomings in the application of the conventional RTS/CTS protocol. Specifically, in implementations of the conventional RTS/CTS protocol, a collision between two RTS packets can occur, which results in neither RTS packet being received by the intended receiver, and which also means that there is no possibility for the intended receiver to respond to the RTS packets. Furthermore, in implementations of the conventional RTS/CTS protocol, a collision between two CTS packets can also occur, where the CTS packets cannot be decoded. Therefore, in the conventional RTS/CTS protocol, data packet transmissions are inhibited, even though the transmissions would otherwise be successful.

Therefore, according to an embodiment of the invention, a new flexible protocol is provided to improve the data rates of nodes suffering high interference without sacrificing performance of nodes that do not need interference-free channels to communicate. In the embodiment, the new flexible protocol can utilize packets which provide for synchronized operation and allow for orthogonalization of reference symbols and control channels. In an embodiment, the new flexible protocol is a RTS/CTS protocol. However, in other embodiments, the new flexible protocol can be another protocol that utilizes a handshake mechanism in order to transmit data packets.

One embodiment of the invention is directed toward a synchronized TDD network, including uplink (UL) and downlink (DL) synchronization. In the network, both UEs and APs can be configured to receive RTS packets and CTS packets. In an embodiment, potential transmitters in the network can transmit RTS packets at the same time in the frequency resources of interest. For example, two transmitters can transmit RTS packets at the same time in selected frequencies in a first orthogonal frequency-division multiplexing (OFDM) symbol of a slot. Potential receivers in the network can transmit CTS packets at the same time in the frequency resources where a transmission is identified as possible by the RTS/CTS protocol. For example, potential receivers can transmit CTS packets in a third OFDM symbol of a slot, where the second symbol is used for a transition between a receiver mode and a transmit mode. In the embodiment, RTS packets can be orthogonal to each other, and CTS packets can be orthogonal to each other. The orthogonal RTS/CTS resources, which are used to transmit and receive RTS packets and CTS packets can be distributed among cells so that nearest neighbors can generally use orthogonal resources. However, in alternative embodiments of the invention, the frequency resources used for data transmission can be different than the frequency resources used for RTS/CTS transmission. For example, a RTS packet or a CTS packet can explicitly describe frequency resources to be used for RTS/CTS transmission, and the frequency resources described in the RTS packet or CTS packet can be different than the frequency resources used for data transmission.

In one embodiment, a receiver is able to receive at least two RTS channels. One of the RTS channels can be used for RTS packets transmitted from the cell that the receiver resides in. The other RTS channels can be used for RTS packets transmitted from neighboring cells.

In the embodiment, a receiver receiving several RTS packets simultaneously is able to identify the RTS packet corresponding to its own cell, as well as the RTS packets belonging to the strongest interferer. Based on the interference level estimated from the RTS packets, the receiver can decide if the channel needs to be interference-free for the intended transmission or if the current level of interference is acceptable.

According to an embodiment of the invention, new types of CTS packets can be provided. The type of CTS packet that is used in transmission can be determined based on the knowledge of where the RTS packet originated from, and the knowledge of whether the intended transmission can tolerate any interference. The type of CTS packet used can convey different information to the recipient of the CTS packet.

In an embodiment, the following types of CTS packets can be provided: CTS/Clear (CTS/C), CTS/Restrict (CTS/R), and CTS/Non-restrict (CTS/N). The CTS/C packet corresponds to the CTS packet of the conventional RTS/CTS protocol. The function of the CTS/C packet is to indicate to the transmitter that it is acceptable to transmit, and to clear the channel by indicating to all possible interferers that they should not transmit in the same resources. The function of the CTS/R packet is to indicate to all potential transmitters (except the transmitter that transmitted the corresponding RTS packet) that they should restrict their transmission power, (or transmission format, or number of multiple-input multiple-output (MIMO) layers) so not to interfere with the subsequent transmission. The function of the CTS/N packet is to indicate to all potential transmitters that no constraints are required to enable the subsequent transmission.

In an embodiment, the types of CTS packets can also be separated into two categories. The first category of CTS packets are CTS packets that are directed to all neighboring nodes. This first category is identified as non-targeted CTS packets. The second category of CTS packets are CTS packets that are specifically directed to certain neighboring nodes, but not directed to other neighboring nodes. This second category is identified as targeted CTS packets.

Thus, in an example embodiment, the possible types of CTS packets can include:

CTS/C (A)—indicating all potential transmitters receiving this packet not to transmit, except the transmitter that transmitted a RTS packet to A or in cell A;

CTS/C (A→BC . . . )—indicating that the transmitter that transmitted a RTS packet to transmitters {B, C, . . . }, or in cells {B, C, . . . } should not transmit, and that this packet is from A or from a receiver in cell A;

CTS/R (A)—indicating that all potential transmitters receiving this packet should restrict their transmission power (or transmission format, or number of MIMO layers), except the transmitter that transmitted a RTS packet to A or in cell A;

CTS/R (A→BC . . . )—indicating that the transmitter that transmitted a RTS packet to transmitters {B, C, . . . }, or in cells {B, C, . . . }, should restrict its transmission power (or transmission format, or number of MIMO layers), and that this packet is from A, or from a receiver in cell A;

CTS/N (A)—indicating that this packet is from A, or from a receiver in cell A, and that no constraints are required from other potential transmitters.

In an embodiment, all types of the CTS packet can also include channel quality indicator (CQI) information to the transmitter that transmitted a RTS packet to A (or in cell A). Thus, the RTS/CTS packets according to the new protocol can take part in functionalities of control channels in cellular systems, related to scheduling, scheduling grants, and CQI reports, in addition to enabling inter-cell interference coordination based on instantaneous transmission needs.

Therefore, according to an embodiment of the invention, a node configured to transmit a CTS packet can decide which type of CTS packet to transmit and the content of the CTS packet, such as which neighboring nodes should be silent, based on the information, signal level, or interference level (or a combination therein) of the at least two RTS channels. The node can further decide which type of CTS packet to transmit and the content of the CTS packet based on measurements performed on the RTS channels, and optionally other channels.

According to an embodiment of the invention, by utilizing the new types of CTS packets, the RTS collisions and CTS collisions that occur in the conventional RTS/CTS protocol can be converted into logical collisions in the new flexible RTS/CTS protocol. The logical collisions occur when the transmitted packets can be decoded, but carry conflicting proposals to the transmitters. According to the embodiment, logical RTS collision resolution becomes possible by intended receivers by evaluating the logical RTS collision and selecting an outcome from possible outcomes. Similarly, logical CTS collision resolution becomes possible by intended transmitters, by evaluating the logical CTS collision and selecting an outcome from possible outcomes. Thus, data packet transmission can occur even in light of RTS collisions or CTS collisions.

Figure 3:
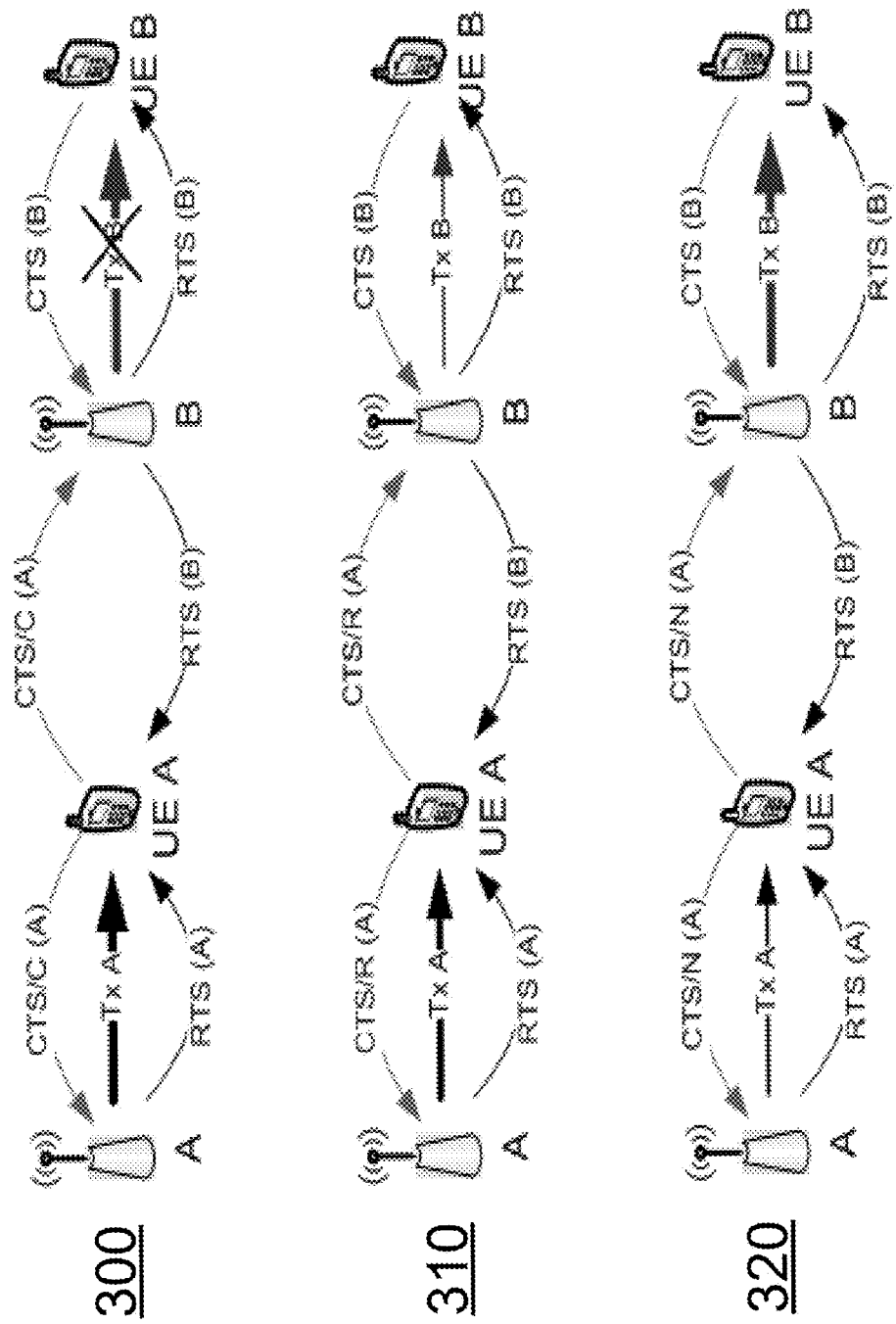
FIG. 3 illustrates different types of CTS packet transmissions and how they overcome RTS collision according to different embodiments of the invention.

FIG. 3 illustrates different types of CTS packet transmissions and how they overcome RTS collision according to different embodiments of the invention. When an intended receiver receives one or more RTS packets, one of which was specifically directed to the intended receiver, the intended receiver can apply a RTS collision resolution algorithm. After applying the algorithm, the intended receiver can reply with one of the different types of CTS packets, or can decide not to reply at all.

FIG. 3 illustrates the possible outcomes of RTS collision resolution, together with the outcomes at the intended transmitter, as well as an interfering transmitter, according to different embodiments. Specifically, in sequence 300, AP A transmits packet RTS (A) to UE A, and AP B simultaneously transmits packet RTS (B) to UE A, thus causing a RTS collision at UE A. According to the embodiment, UE A applies a RTS collision resolution algorithm and determines that a data packet transmission from AP A can occur, but that no other transmissions in the neighboring area should occur, as other transmissions will interfere with the data packet transmission from AP A. Therefore, UE A transmits packet CTS/C (A) to both AP A and AP B. As described above, a CTS/C packet indicates that all potential transmitters that receive the CTS/C packet should not transmit, except the transmitter that specifically directed the original RTS packet to UE A. Therefore, AP A transmits data packet Tx A to UE A, as AP A specifically directed packet RTS (A) to UE A. In contrast, AP B fails to transmit data packet Tx B to UE B, because packet RTS (B) was specifically directed toward UE B, and AP B merely relayed packet RTS (B) to UE A in an attempt to clear the channel. It is important to note that, even though AP B receives packet CTS (B) from UE B, AP B refuses to respect packet CTS (B) and refrains from transmitting data packet Tx B because of the received CTS/C (A) packet from UE A.

In sequence 310, similar to sequence 300, AP A transmits packet RTS (A) to UE A, and AP B simultaneously transmits packet RTS (B) to UE A, thus causing a RTS collision at UE A. According to the embodiment, UE A applies a RTS collision resolution algorithm. However, in this embodiment, UE A determines that data packet transmissions from AP A and AP B can occur simultaneously, but that the transmission power, or transmission format, of the data packet transmission from AP B should be modified, so as not to interfere with the data packet transmission from AP A. Therefore, UE A transmits packet CTS/R (A) to all transmitters in the neighborhood, including AP A and AP B. As described above, a CTS/R packet indicates that indicating that all potential transmitters receiving the CTS/R packet should restrict their transmission power (or transmission format, or number of MIMO layers), except the transmitter that specifically directed the original RTS packet to UE A. In an embodiment, the CTS/R packet can also include a proposed transmission format that AP A should use, or an signal-to-interference ratio (SINR) estimate that takes into account the restriction on AP B's transmission. Therefore, AP A transmits data packet Tx A to UE A, and AP B transmits data packet Tx B to UE B, using a modified transmission power (or modified transmission format or modified number of MIMO layers).

In sequence 320, similar to sequences 300 and 310, AP A transmits packet RTS (A) to UE A, and AP B simultaneously transmits packet RTS (B) to UE A, thus causing a RTS collision at UE A. According to the embodiment, UE A applies a RTS collision resolution algorithm. However, in this embodiment, UE A determines that data packet transmissions from AP A and AP B can occur simultaneously despite the current interference situation, and no actions are required from AP B. Therefore, UE A transmits packet CTS/N (A) to both AP A and AP B. As described above, a CTS/N packet indicates that this packet is from UE A, and that no constraints are required from other potential transmitters. In an embodiment, the CTS/N packet can also include a proposed transmission format that AP A should use, or an SINR estimate. Therefore, AP A transmits data packet Tx A to UE A, and AP B transmits data packet Tx B to UE B.

While embodiments of the invention have been discussed in relation to logical RTS collision resolution, embodiments of the invention can also provide for logical CTS collision resolution. Specifically, by using orthogonal CTS channels for neighbors, a mechanism for logical CTS collision is provided when a potential transmitter receives two or more CTS packets. In an embodiment of the invention, a CTS/C packet overrides all other types of CTS packets. This is because a CTS/C packet is a last resort taken by an intended receiver that is suffering from heavy interference, and that receiver takes priority over all other potential receivers. However, as discussed below in more detail, the different kinds of CTS packets results in several kinds of possible logical CTS collisions.

Figure 4:
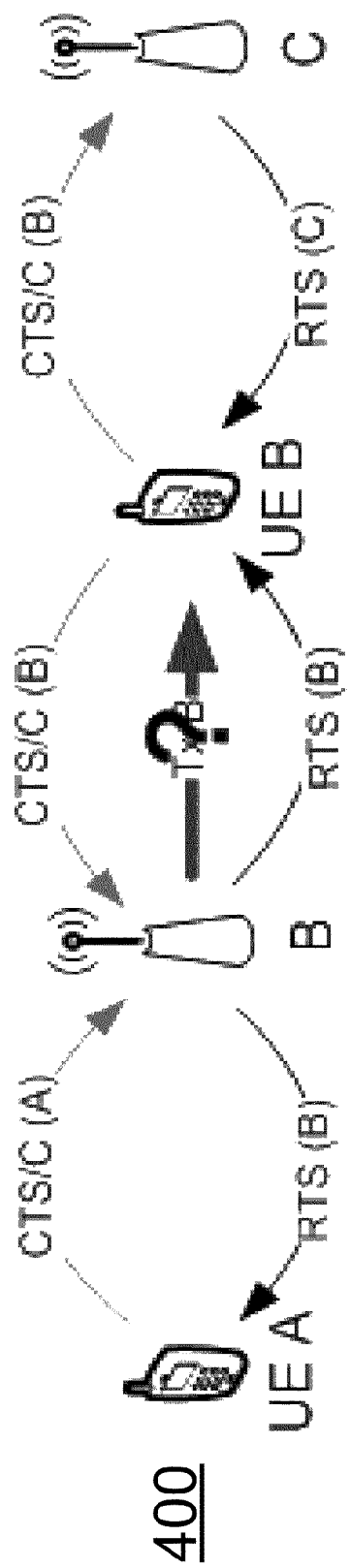
FIG. 4 illustrates a logical CTS/C collision according to an embodiment of the invention.

FIG. 4 illustrates a logical CTS/C collision according to an embodiment of the invention. In sequence 400 of the illustrated embodiment, AP B receives a packet CTS/C (B) from UE B, which indicates that UE B is actively attempting to clear interference, so that AP B may proceed with a data packet transmission. Simultaneously, AP B receives a packet CTS/C (A) from UE A, which indicates that UE A is attempting to clear the data packet transmission from AP B, and possibly other data packet transmissions. Thus, there is an outgoing CTS/C packet from the cell of AP B, and an incoming CTS/C packet from the cell of AP B, thus causing a logical CTS/C collision.

This type of logical CTS/C collision is the most difficult collision to resolve, because each data packet transmission requires the complete absence of interference. However, the logical CTS/C collision can be resolved in different ways according to different embodiments of the invention. In one embodiment, AP B resolves the logical CTS/C collision by deciding not to transmit data packet Tx B. This option corresponds to a situation where the collision is on a physical layer, as in prior art systems which utilize CTS packets. In another embodiment, AP B resolves the logical CTS/C collision by analyzing external variables and deciding to transmit data packet Tx B based on the external variables. The external variables can include a system frame number, an identity (ID) of a cell, an ID of the two or more RTS/CTS channels, or a deterministic relation between two or more of the previously described external variables. In another embodiment, AP B resolves the logical CTS/C collision based on a random decision. More specifically, AP B decides whether to transmit data packet Tx B based on a probability of CTS/C transmissions. In an embodiment, the probability of CTS/C transmissions may be a system parameter negotiated in the network neighborhood. In another embodiment, AP B resolves the logical CTS/C collision by analyzing the CQIs reported in the CTS/C packets and deciding to transmit data packet Tx B based on the CQIs reported in the CTS/C packets.

In the previous embodiments, only non-targeted CTS packets directed to all neighboring nodes were discussed in relation to logical CTS collision resolution. However, with targeted CTS packets specifically directed to certain neighboring nodes, more refined collision resolution is possible.

Figure 5:
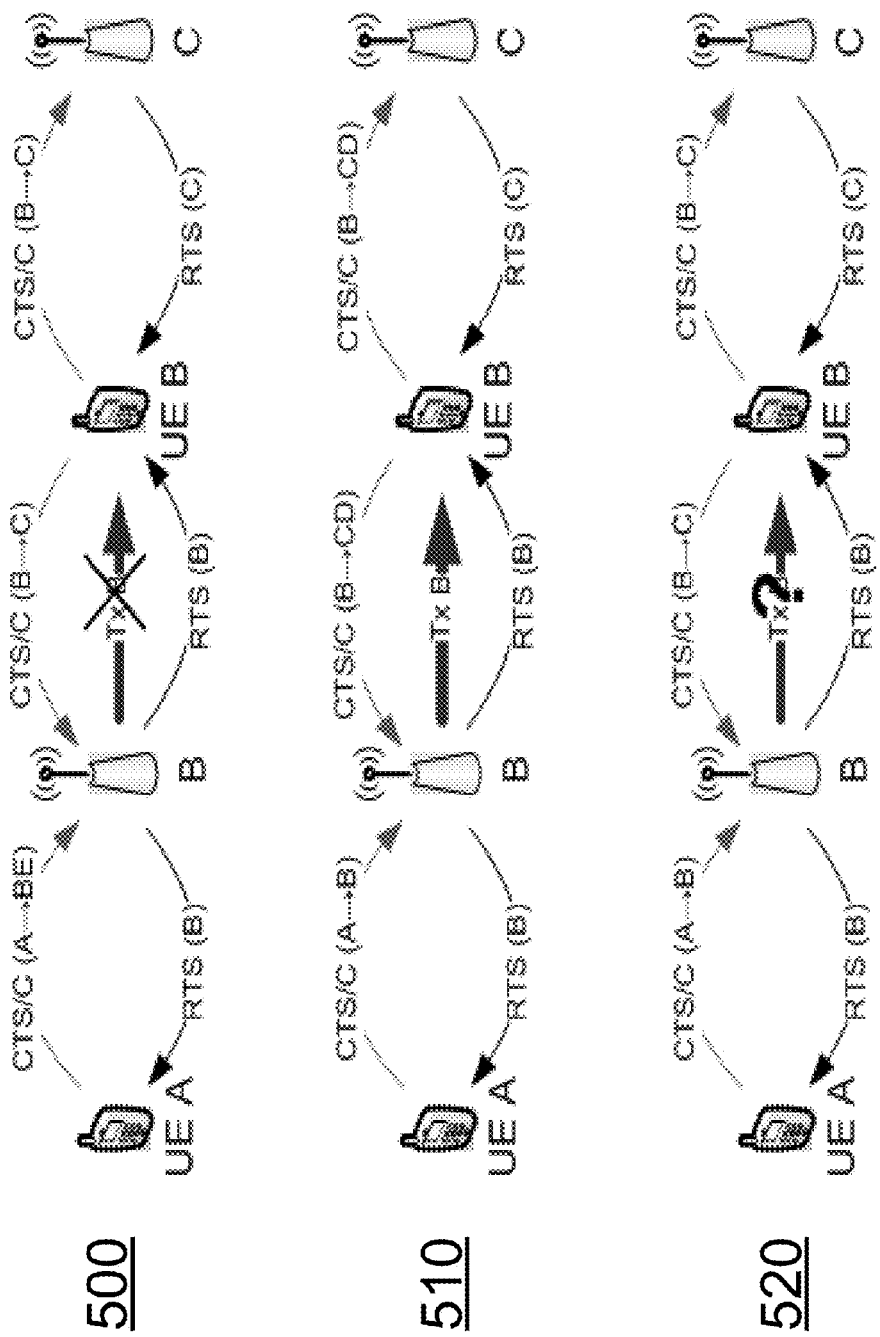
FIG. 5 illustrates different resolutions of a logical CTS/C collision according to different embodiments of the invention.

FIG. 5 illustrates different resolutions of a logical CTS/C collision according to different embodiments of the invention, where the CTS packets are targeted CTS packets, specifically directed to certain neighboring nodes. In sequence 500, AP B receives packet CTS/C (A→BE) from UE A. Packet CTS/C (A→BE) is an incoming CTS/C packet, attempting to clear a data packet transmission in the cell of AP B and a data packet transmission in the cell of AP E (not shown), in order to allow a data packet transmission in the cell of AP A to proceed. Simultaneously, AP B receives packet CTS/C (B→C) from UE B. Packet CTS/C (B→C) is an outgoing CTS/C packet, attempting to clear a data packet transmission in the cell of AP C, in order to allow a data packet transmission in the cell of AP B to proceed. AP B resolves this collision by not transmitting data packet Tx B to UE B. Specifically, AP B determines that the data packet transmission of AP A takes priority over the data packet transmission of AP B, because packet CTS/C (A→BE) requested to clear more data packet transmissions than packet CTS/C (B→C). In other words, because UE A requested to clear data packet transmissions in two cells (i.e., the cell of AP B and the cell of AP E), whereas, UE B only requested to clear a data packet transmission in one cell (i.e., the cell of AP C), UE A's request is given priority, and AP B refrains from transmitting data packet Tx B.

In sequence 510, AP B receives packet CTS/C (A→B) from UE A. Packet CTS/C (A→B) is an incoming CTS/C packet, attempting to clear a data packet transmission in the cell of AP B, in order to allow a data packet transmission in the cell of AP A to proceed. Simultaneously, AP B receives packet CTS/C (B→CD) from UE B. Packet CTS/C (B→CD) is an outgoing CTS/C packet, attempting to clear a data packet transmission in the cell of AP C and a data packet transmission in the cell of AP D (not shown), in order to allow a data packet transmission in the cell of AP B to proceed. This is the reverse scenario of sequence 500. Now, in sequence 510, UE B is requesting to clear more data packet transmissions than UE A. AP B resolves this collision by transmitting data packet Tx B to UE B, notwithstanding UE A's request to clear the data packet transmission, and clearing the data packet transmission in the cell of AP C and in the cell of AP D (not shown). Specifically, AP B determines that the data packet transmission of AP B takes priority over the data packet transmission of AP A, because packet CTS/C (B→CD) requested to clear more data packet transmissions than packet CTS/C (A→B).

In sequence 520, AP B receives packet CTS/C (A→B) from UE A. Packet CTS/C (A→B) is an incoming CTS/C packet, attempting to clear a data packet transmission in the cell of AP B, in order to allow a data packet transmission in the cell of AP A to proceed. Simultaneously, AP B receives packet CTS/C (B→C) from UE B. Packet CTS/C (B→C) is an outgoing CTS/C packet, attempting to clear a data packet transmission in the cell of AP C, in order to allow a data packet transmission in the cell of AP B to proceed. In this scenario, UE A and UE B are requesting to clear the same number of data packet transmissions. In this case, collision resolution can be performed as when non-targeted CTS/C packets are colliding, as discussed above. More specifically, in one embodiment, AP B resolves the logical CTS/C collision by deciding not to transmit data packet Tx B. This option corresponds to a situation where the collision is on a physical layer, as in prior art systems which utilize CTS packets. In another embodiment, AP B resolves the logical CTS/C collision by analyzing external variables and deciding to transmit data packet Tx B based on the external variables. The external variables can include a system frame number, an ID of the cell, an ID of the two or more RTS/CTS channels, or a deterministic relation between two or more of the previously described external variables. In another embodiment, AP B resolves the logical CTS/C collision based on a random decision. More specifically, AP B decides whether to transmit data packet Tx B based on a probability of CTS/C transmissions. In an embodiment, the probability of CTS/C transmissions may be a system parameter negotiated in the network neighborhood. In another embodiment, AP B resolves the logical CTS/C collision by analyzing the CQIs reported in the CTS/C packets and deciding to transmit data packet Tx B based on the CQIs reported in the CTS/C packets.

In scenarios when targeted CTS/C packets collide with targeted CTS/R packets, other types of logical CTS collision resolutions are possible. According to one embodiment of the invention, similar to the embodiment described in FIG. 5, an intended transmitter resolves the logical CTS collision resolution based on the number of clearings requested by the targeted CTS/C packet, and the number of restrictions requested by the targeted CTS/R packet. Thus, the packet that requests the higher number of clearings, or restrictions, takes priority over the other packet, and is acted upon, while the other packet is ignored. In another embodiment, a weighting may be used so that clearings take higher priority than restrictions, and vice-versa. Specifically, in the embodiment, constants a and b may be used to weigh the value of clearings and restrictions using the following formula:

packet value=$a$*(number of clearings)+$b$*(number of restrictions).

Thus, in the embodiment, the targeted CTS/C packet (or targeted CTS/R packet) with the higher packet value takes priority and is acted upon.

According to an embodiment, in the scenario where there are as many clearings/restrictions in each CTS/C packet, or CTS/R packet, a CTS/C packet takes priority over a CTS/R packet or a CTS/N packet. However, according to other embodiments, a logical CTS collision resolution of a CTS/C packet and a CTS/R packet (or CTS/N packet) can depend on specific circumstances, as will be discussed in more detail in relation to FIG. 6.

Figure 6:
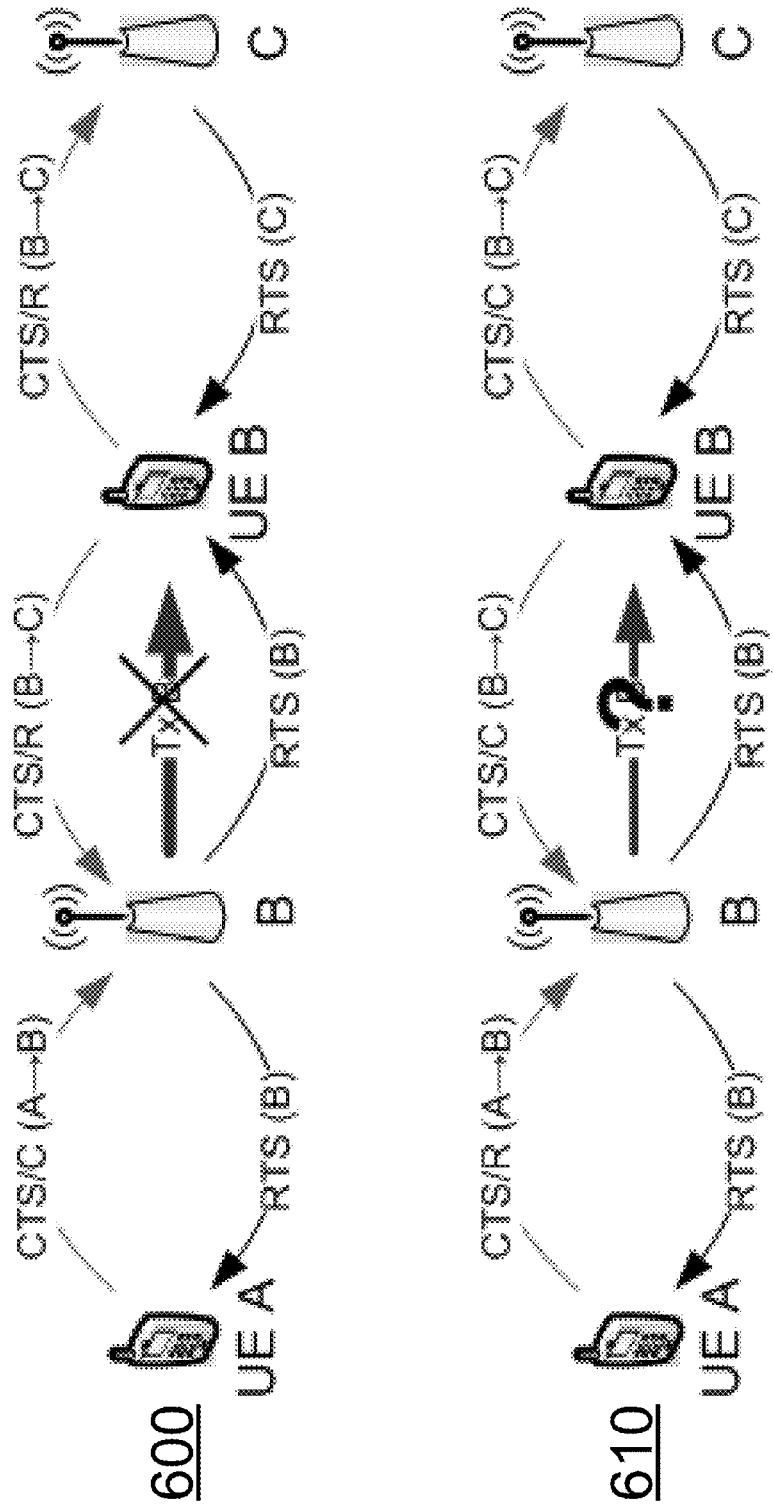
FIG. 6 illustrates different resolutions of CTS/C and CTS/R collisions according to different embodiments of the invention.

FIG. 6 illustrates different resolutions of CTS/C and CTS/R collisions according to different embodiments of the invention. In sequence 600, AP B receives packet CTS/C (A→B) from UE A. Packet CTS/C (A→B) is an incoming CTS/C packet, attempting to clear a data packet transmission in the cell of AP B, in order to allow a data packet transmission in the cell of AP A to proceed. Simultaneously, AP B receives packet CTS/R (B→C) from UE B. Packet CTS/R (B→C) is an outgoing CTS/R packet, attempting to restrict a data packet transmission in the cell of AP C, in order to allow a data packet transmission in the cell of AP B to proceed. AP B resolves this collision by not transmitting data packet Tx B to UE B. Specifically, AP B determines that the data packet transmission of AP A takes priority over the data packet transmission of AP B, based on the principle discussed above that a CTS/C packet takes priority over a CTS/R packet. Although not shown in FIG. 6, if packet CTS/R (B→C) was replaced with CTS/N (B→C), the result of the logical CTS collision resolution would be the same, because a CTS/C packet also takes priority over a CTS/N packet.

In sequence 610, AP B receives packet CTS/R (A→B) from UE A. Packet CTS/R (A→B) is an incoming CTS/R packet, attempting to restrict a data packet transmission in the cell of AP B, in order to allow a data packet transmission in the cell of AP A to proceed. Simultaneously, AP B receives packet CTS/C (B→C) from UE B. Packet CTS/C (B→C) is an outgoing CTS/C packet, attempting to clear a data packet transmission in the cell of AP C, in order to allow a data packet transmission in the cell of AP B to proceed. This scenario is different from the scenario in sequence 600, because the incoming packet is a CTS/R packet, whereas the outgoing packet is a CTS/C packet. AP B can resolve the logical CTS collision by one of multiple alternatives, according to different embodiments of the invention.

In one embodiment, AP B can resolve the collision by ignoring packet CTS/R (A→B) from UE A, and transmitting data packet Tx B according to the CQI indicated in packet CTS/C (B→C). In another embodiment, AP B can resolve the collision by obeying the restriction indicated in packet CTS/R (A→B), and transmitting data packet Tx B using a modified transmission power (or modified transmission format or modified number of MIMO layers). In another embodiment, AP B can resolve the collision by only obeying the restriction indicated in packet CTS/R (A→B), if the restriction, combined with the CQI information indicated in packet CTS/C (B→C), allows for a minimum service for the transmission of data packet Tx B. If this condition is met, AP B can transmit data packet Tx B using a modified transmission power (or modified transmission format or modified number of MIMO layers). If this condition is not met, then AP B can ignore packet CTS/R (A→B) from UE A, and transmit data packet Tx B according to the CQI indicated in packet CTS/C (B→C).

The decision taken by AP B in the logical CTS collision resolution can depend on whether the outgoing packet is a CTS/C packet or a CTS/R packet. In an embodiment, if the outgoing packet is a CTS/C packet, rather than a CTS/R packet, AP B can decide to ignore the incoming CTS/R packet because the outgoing CTS/C packet signifies that the data packet transmission from AP B has little to no tolerance to interference, and that any restriction on the data packet transmission from AP B may compromise the data packet transmission. In contrast, if the outgoing packet is a CTS/R packet, rather than a CTS/C packet, AP B can decide to obey the incoming CTS/R packet, because the outgoing CTS/R packet signifies that the data packet transmission from AP B can tolerate some interference, and that the restriction on the data packet transmission from AP B may not compromise the data packet transmission.

The decision taken by AP B in the logical CTS collision resolution can also depend on the requested restriction of the incoming CTS/R packet. For example, in an embodiment, if the restriction of the incoming CTS/R packet requests to lower the transmission power of the data packet transmission from AP B, AP B can decide to ignore the incoming CTS/R packet, because lowering the transmission power may not be viable, in light of the fact that UE A has transmitted a CTS/C packet. In contrast, if the restriction of the incoming CTS/R packet requests to modify the data rate of the data packet transmission from AP B, AP B can decide to obey the incoming CTS/R packet, because AP B can still transmit data packet Tx B at a high transmission power rate, which can cancel at least part of the interference, and thus, AP B can still transmit data packet Tx B to UE B.

Figure 7:
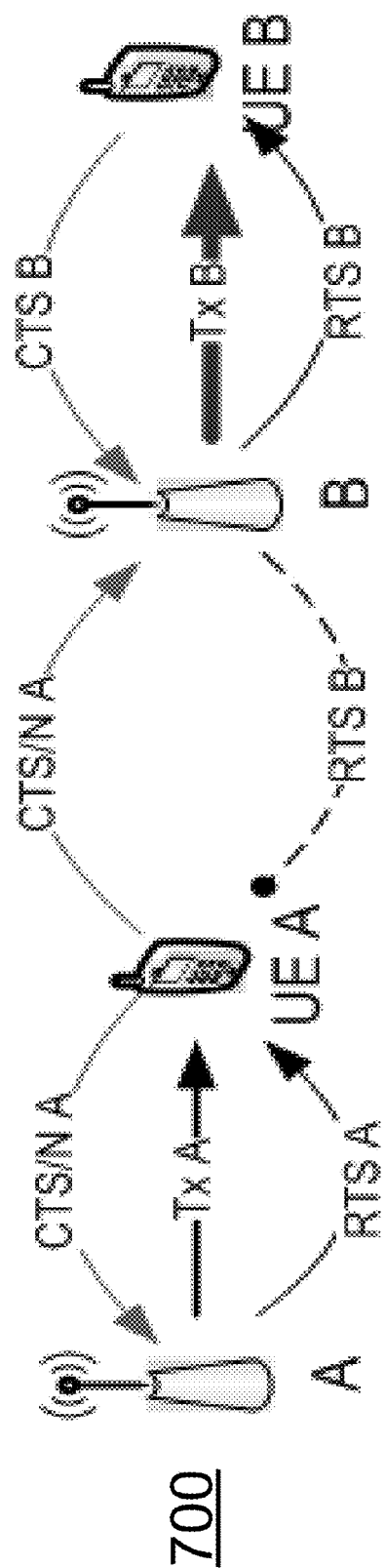
FIG. 7 illustrates an automatic CTS collision resolution according to an embodiment of the invention.

FIG. 7 illustrates an automatic CTS collision resolution according to an embodiment of the invention. According to the embodiment, the problems in a conventional RTS/CTS protocol of lost RTS packets discussed in relation to FIG. 2 can be solved. Specifically, in FIG. 7, AP A transmits packet RTS A, and AP B transmits packet RTS B. UE A receives packet RTS A, but does not receive packet RTS B due to packet loss (such as signal degradation over the system, an oversaturated channel, a corruption of the packet RTS B causing the packet to be rejected in-transit, or a underlying hardware problem). Because UE A only receives packet RTS A, and does not receive packet RTS B, UE A transmits packet CTS/N A to APs A and B. Furthermore, UE B transmits packet CTS B to AP B, in response to packet RTS B. Thus, there is a collision between packet CTS/N A and packet CTS B at AP B. However, in contrast to the conventional RTS/CTS protocol illustrated in FIG. 2, AP B converts the CTS packet collision into a logical CTS collision, and resolves the collision. Specifically, AP B determines that the CTS/N A packet indicates that the transmission of data packet Tx A does not require any restrictions. Thus, AP B transmits data packet Tx B, notwithstanding the simultaneous transmission of data packet Tx A by AP A. Thus, AP B is not required to be silent, and the problem due to a lost RTS packet is automatically solved, according to the embodiment. Although not shown in FIG. 7, packet CTS B can be replaced with a CTS/C B packet, without changing the result (i.e., AP B can transmit data packet Tx B to UE B).

When targeted CTS/C packets or targeted CTS/R packets are used, a scenario can arise where a receiver in cell A wants to restrict a transmission in cell B, and simultaneously a receiver in cell B wants to restrict a transmission in cell A. In this case, a collision will arise in both a transmitter of cell A and a transmitter of cell B. These types of collisions are identified as two-way collisions.

Figure 8:
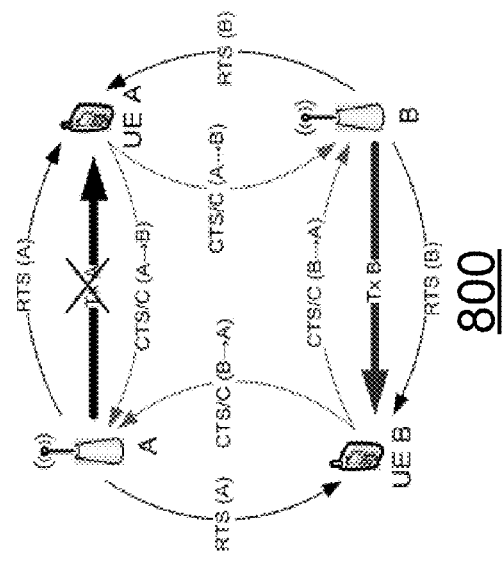
FIG. 8 illustrates different resolutions of two-way logical CTS collisions according to different embodiments of the invention.
Figure 8:
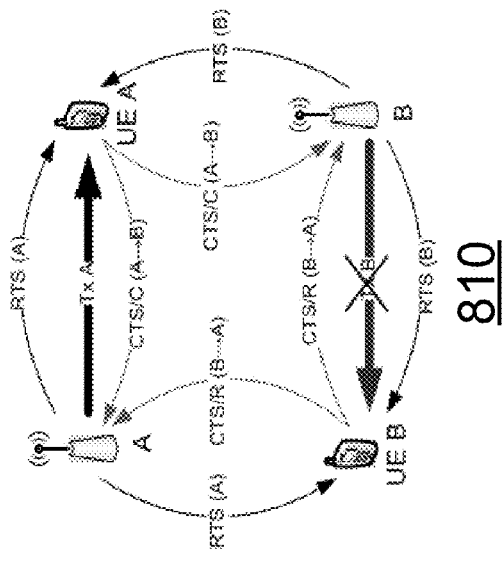
Figure 8:
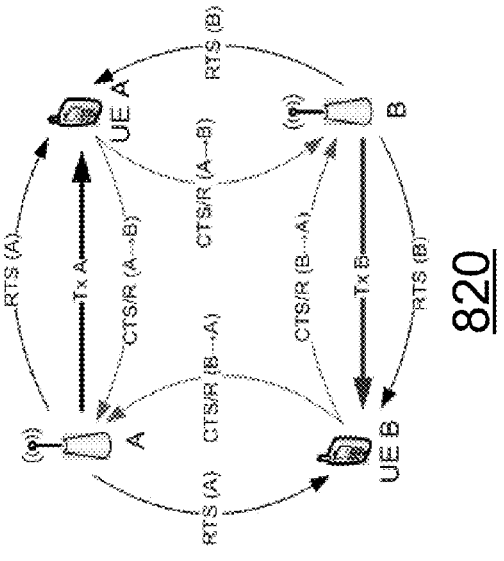
Figure 8:
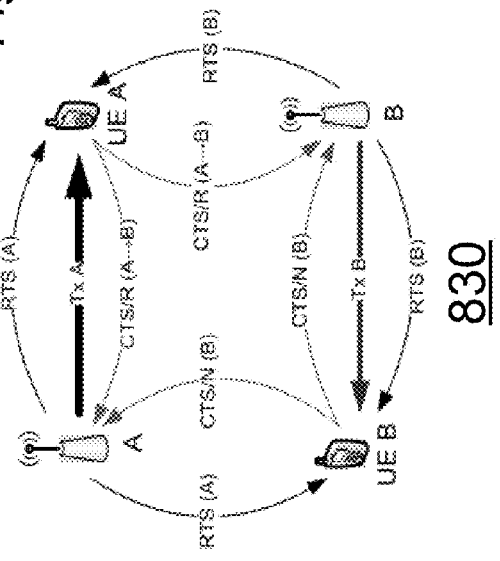

FIG. 8 illustrates different resolutions of two-way logical CTS collisions according to different embodiments of the invention. In sequence 800, UE A transmits packet CTS/C (A→B) to both AP A and AP B in response to receiving packet RTS (A) from AP A. Packet CTS/C (A→B) is a CTS/C packet, attempting to clear a data packet transmission in the cell of AP B, in order to allow a data packet transmission in the cell of AP A to proceed. Simultaneously, UE B transmits packet CTS/C (B→A) to both AP A and AP B in response to receiving packet RTS (B) from AP B. Packet CTS/C (B→A) is a CTS/C packet, attempting to clear a data packet transmission in the cell of AP A, in order to allow a data packet transmission in the cell of AP B to proceed. Therefore, at both AP A and AP B, a two-way logical CTS collision occurs. The two-way logical CTS collision can be resolved by one of multiple alternatives, according to different embodiments of the invention.

In one embodiment, the number of restrictions/clearings directed to other cells than the cells at issue (i.e., the cell of AP A and the cell of AP B) is determined. For example, it is determined how many cells, other than the cell of AP A and the cell of AP B, the CTS/C packet transmitted by UE A is requesting to restrict/clear. It is then determined how many cells, other than the cell of AP A and the cell of AP B, the CTS/C packet transmitted by UE B is requesting to restrict/clear. Subsequently, AP A and AP B each obey the CTS/C packet which is requesting to restrict/clear the larger number of cells, other than the cell of AP A and the cell of AP B, and ignore the other CTS/C packet.

For example, in the resolution of a collision of packet CTS/C (A→BC) and packet CTS/C (B→A) (not shown in FIG. 8), packet CTS/C (A→BC) takes priority over packet CTS/C (B→A), because packet CTS/C (A→BC) is requesting to clear one cell other than the cell of AP B (i.e., the cell of AP C (not shown)), whereas packet CTS/C (B→A) is not requesting to clear any cells other than the cell of AP A. However, in sequence 800 of FIG. 8, this resolution leads to a draw because neither packet CTS/C (A→B) nor CTS/C (B→A) is requesting to clear any cells other than the cell of AP A and the cell of AP B.

In case of a draw, in the embodiment, the two-way logical CTS collision is resolved by analyzing external variables. The external variables can include a system frame number, an ID of a cell, an ID of the two or more RTS/CTS channels, or a deterministic relation between two or more of the previously described external variables. Depending on the analysis of external variables, one CTS/C packet is obeyed, and the other CTS/C packet is ignored. In sequence 800 of FIG. 8, it is determined by analyzing external variables that packet CTS/C (B→A) takes priority over CTS/C (A→B). Thus, AP A and AP B each ignore packet CTS/C (A→B) and obey packet CTS/C (B→A). Therefore, AP A fails to transmit data packet Tx A to UE A and AP B transmits data packet Tx B to UE B.

According to embodiments of the invention, logical CTS collisions between other kinds of targeted CTS packets can be solved in a deterministic way without resorting to external variables. In sequence 810, UE A transmits packet CTS/C (A→B) to both AP A and AP B in response to receiving packet RTS (A) from AP A. Packet CTS/C (A→B) is a CTS/C packet, attempting to clear a data packet transmission in the cell of AP B, in order to allow a data packet transmission in the cell of AP A to proceed. Simultaneously, UE B transmits packet CTS/R (B→A) to both AP A and AP B in response to receiving packet RTS (B) from AP B. Packet CTS/R (B→A) is a CTS/R packet, attempting to restrict a data packet transmission in the cell of AP A, in order to allow a data packet transmission in the cell of AP B to proceed. Therefore, at both AP A and AP B, a two-way logical CTS collision occurs, between packet CTS/C (A→B) and packet CTS/R (B→A). In the embodiment, the two-way logical CTS collision is resolved by determining that a targeted CTS/C packet takes priority over a targeted CTS/R packet (or a CTS/N packet), and thus, packet CTS/C (A→B) takes priority over packet CTS/R (B→A). Thus, in sequence 810 of FIG. 8, AP A and AP B each obey packet CTS/C (A→B) and ignore packet CTS/R (B→A). Therefore, AP A transmits data packet Tx A to UE A and AP B fails to transmit data packet Tx B to UE B.

In sequence 820, UE A transmits packet CTS/R (A→B) to both AP A and AP B in response to receiving packet RTS (A) from AP A. Packet CTS/R (A→B) is an CTS/R packet, attempting to restrict a data packet transmission in the cell of AP B, in order to allow a data packet transmission in the cell of AP A to proceed. Simultaneously, UE B transmits packet CTS/R (B→A) to both AP A and AP B in response to receiving packet RTS (B) from AP B. Packet CTS/R (B→A) is a CTS/R packet, attempting to restrict a data packet transmission in the cell of AP A, in order to allow a data packet transmission in the cell of AP B to proceed. Therefore, at both AP A and AP B, a two-way logical CTS collision occurs, between packet CTS/R (A→B) and packet CTS/R (B→A). In the embodiment, the two-way logical CTS collision is resolved by following the restriction indicated by each CTS/R packet, if the restriction is possible to follow according to the CQI report included in each CTS/R packet. If it is not possible to follow the restriction indicated by each CTS/R packet, then a deterministic function is applied by each transmitter to select the transmission rate, transmission power, or both, based on the restriction and CQI of each CTS/R packet. Thus, in sequence 820 of FIG. 8, AP A obeys the restriction of packet CTS/R (B→A) and transmits data packet Tx A to UE A using a modified transmission power (or modified transmission format or modified number of MIMO layers). Likewise, AP B obeys the restriction of packet CTS/R (A→B) and transmits data packet Tx B to UE B using a modified transmission power (or modified transmission format or modified number of MIMO layers).

In sequence 830, UE A transmits packet CTS/R (A→B) to both AP A and AP B in response to receiving packet RTS (A) from AP A. Packet CTS/R (A→B) is an CTS/R packet, attempting to restrict a data packet transmission in the cell of AP B, in order to allow a data packet transmission in the cell of AP A to proceed. Simultaneously, UE B transmits packet CTS/N (B) to both AP A and AP B in response to receiving packet RTS (B) from AP B. Packet CTS/N (B) is a CTS/N packet, indicating that a data packet transmission in the cell of AP B is about to proceed, and that no restriction in any neighboring cell is required. Therefore, at both AP A and AP B, a two-way logical CTS collision occurs, between packet CTS/R (A→B) and packet CTS/N (B). In the embodiment, the two-way logical CTS collision is resolved by following the restriction indicated by packet CTS/R (A→B), if the restriction is possible to follow according to the CQI report included in packet CTS/R (A→B) and packet CTS/N (B). If it is not possible to follow the restriction indicated by packet CTS/R (A→B), then a deterministic function is applied by each transmitter to select the transmission rate, transmission power, or both, based on the restriction of packet CTS/R (A→B), and the CQI of packet CTS/R (A→B) and packet CTS/N (B). Thus, in sequence 830 of FIG. 8, AP A transmits data packet Tx A to UE A with no modifications. Furthermore, AP B obeys the restriction of packet CTS/R (A→B) and transmits data packet Tx B to UE B using a modified transmission power (or modified transmission format or modified number of MIMO layers).

In another scenario, a collision can arise in a transmitter of cell A, a transmitter of cell B, and a transmitter of cell C. These types of collisions are identified as three-way collisions. Taking into account the number of cleared/restricted transmissions can solve many three-way collisions.

Figure 9:
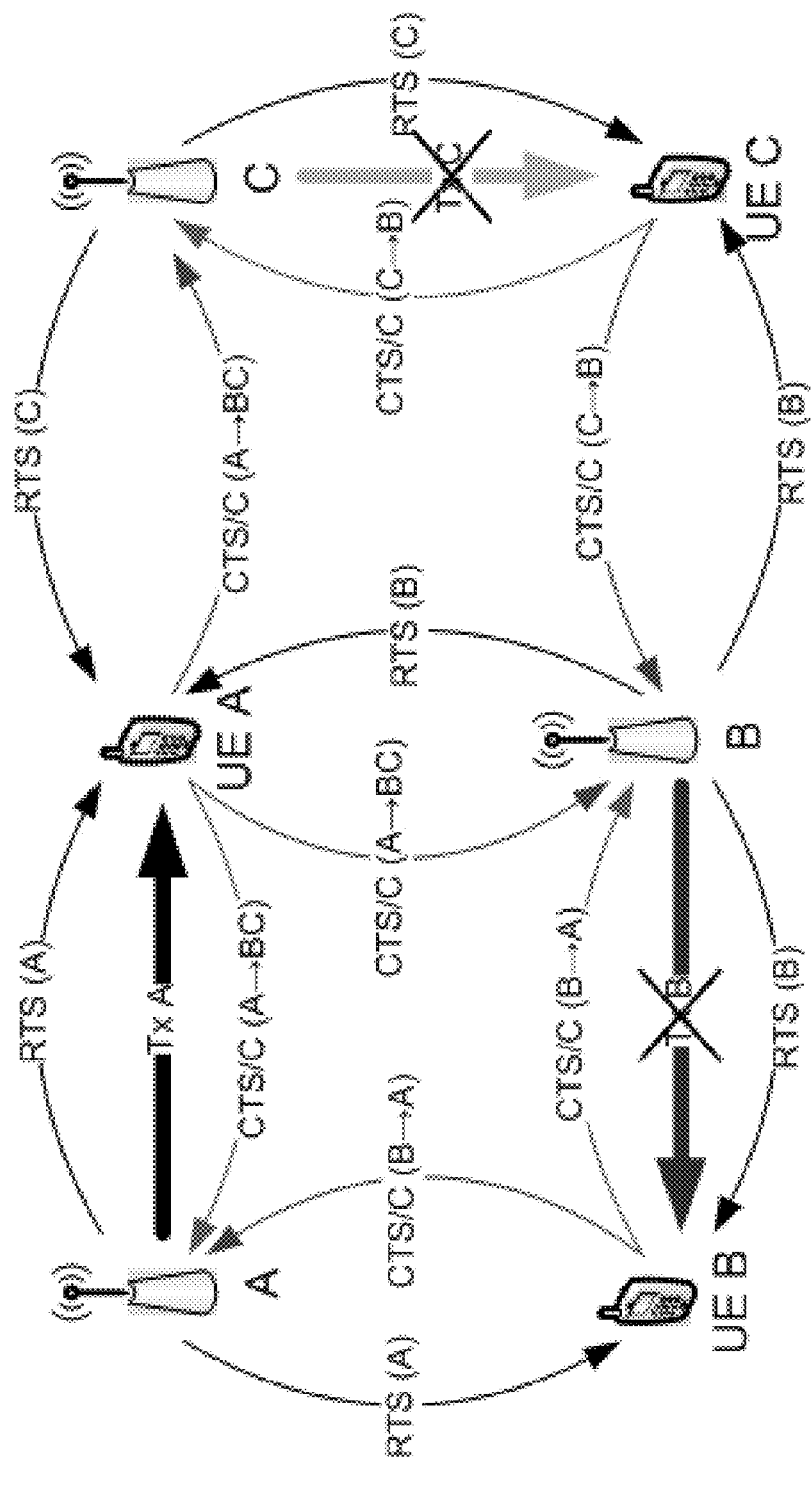
FIG. 9 illustrates a resolution of a three-way CTS collision according to an embodiment of the invention.

FIG. 9 illustrates a resolution of a three-way CTS collision according to an embodiment of the invention. In sequence 900, UE A transmits packet CTS/C (A→BC) to AP A, AP B, and AP C in response to receiving packet RTS (A) from AP A. Packet CTS/C (A→BC) is an CTS/C packet, attempting to clear a data packet transmission in the cell of AP B and a data packet transmission in the cell of AP C, in order to allow a data packet transmission in the cell of AP A to proceed. At the same time, UE B transmits packet CTS/C (B→A) to both AP A and AP B in response to receiving packet RTS (B) from AP B. Packet CTS/C (B→A) is a CTS/C packet, attempting to clear a data packet transmission in the cell of AP A, in order to allow a data packet transmission in the cell of AP B to proceed. Also at the same time, UE C transmits packet CTS/C (C→B) to both AP B and AP C in response to receiving packet RTS (C) from AP C. Packet CTS/C (C→B) is a CTS/C packet, attempting to clear a data packet transmission in the cell of AP B, in order to allow a data packet transmission in the cell of AP C to proceed. Therefore, a three-way logical CTS collision occurs.

According to the embodiment, the three-way logical CTS collision is resolved by giving priority to the CTS/C packet that is requesting to clear the largest number of cells. In this embodiment, packet CTS/C (A→BC) is request to clear the largest number of cells (i.e., two cells), as compared to packet CTS/C (B→A) and packet CTS/C (C→B), which each request to clear only one cell. Thus, AP A obeys packet CTS/C (A→BC) and ignores packet CTS/C (B→A), AP B obeys packet CTS/C (A→BC) and ignores packet CTS/C (B→A) and packet CTS/C (C→B), and AP C obeys packet CTS/C (A→BC) and ignores packet CTS/C (C→B). Therefore, AP A transmits data packet Tx A to UE A, AP B fails to transmit data packet Tx B to UE B, and AP C fails to transmit data packet Tx C to UE C.

In another scenario, a collision can arise in a transmitter of cell A, a transmitter of cell B, a transmitter of cell C, and a transmitter of cell D. These types of collisions are identified as four-way collisions. Four-way collisions can present unique challenges, as will be discussed below in more detail.

Figure 10:
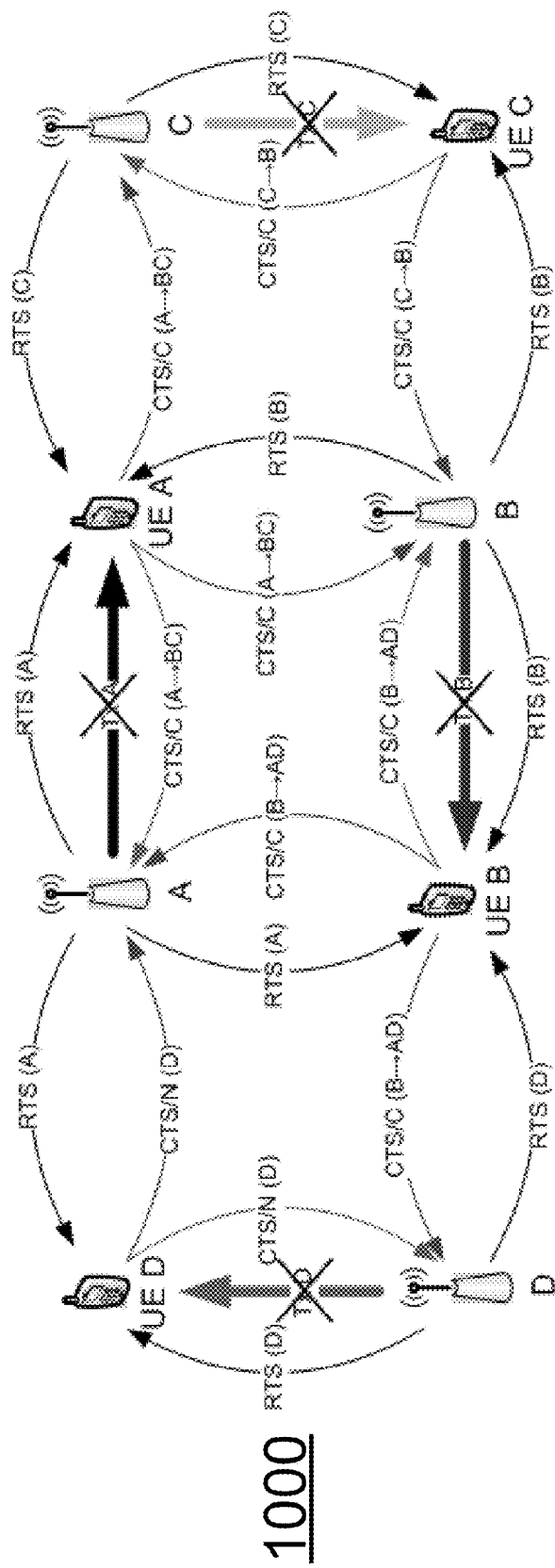
FIG. 10 illustrates a resolution of a four-way CTS collision according to an embodiment of the invention.

FIG. 10 illustrates a resolution of a four-way CTS collision according to an embodiment of the invention. In sequence 1000, UE A transmits packet CTS/C (A→BC) to AP A, AP B, and AP C in response to receiving packet RTS (A) from AP A. Packet CTS/C (A→BC) is an CTS/C packet, attempting to clear a data packet transmission in the cell of AP B and a data packet transmission in the cell of AP C, in order to allow a data packet transmission in the cell of AP A to proceed. At the same time, UE B transmits packet CTS/C (B→AD) to AP A, AP B, and AP D in response to receiving packet RTS (B) from AP B. Packet CTS/C (B→AD) is a CTS/C packet, attempting to clear a data packet transmission in the cell of AP A and a data packet transmission in the cell of AP D, in order to allow a data packet transmission in the cell of AP B to proceed. Also at the same time, UE C transmits packet CTS/C (C→B) to both AP B and AP C in response to receiving packet RTS (C) from AP C. Packet CTS/C (C→B) is a CTS/C packet, attempting to clear a data packet transmission in the cell of AP B, in order to allow a data packet transmission in the cell of AP C to proceed. Finally, at the same time, UE D transmits packet CTS/N (D) to AP A and AP D. Packet CTS/N (D) is a CTS/N packet, indicating that a data packet transmission in the cell of AP D is about to proceed, and that no restriction in any neighboring cell is required. Therefore, a four-way logical CTS collision occurs.

According to the embodiment, the four-way logical CTS collision is resolved by first determining that a targeted CTS/C packet takes priority over a CTS/N packet. Thus, packet CTS/C (A→BC), packet CTS/C (B→AD), and packet CTS/C (C→B) are all given priority over packet CTS/N (D). The four-way logical CTS collision is further resolved by giving priority to the CTS/C packet that is requesting to clear the largest number of cells. Thus, packet CTS/C (A→BC) and packet CTS/C (B→AD) are both given priority over packet CTS/C (C→B). The four-way logical CTS collision is further resolved by analyzing external variables The external variables can include a system frame number, an ID of the cell, an ID of the two or more RTS/CTS channels, or a deterministic relation between two or more of the previously described external variables. The outcome in certain cases can be that AP A and AP B refrain from transmitting. Thus, the outcome in sequence 1000 of FIG. 10 is that all four transmissions are cleared. Specifically, AP A fails to transmit data packet Tx A to UE A, AP B fails to transmit data packet Tx B to UE B, AP C fails to transmit data packet Tx C to UE C, and AP D fails to transmit data packet Tx D to UE D.

However, in an alternative embodiment (not shown in FIG. 10), one way of increasing spectrum efficiency ensuing from four-way collisions is to adopt a rule that if a first cell is involved in a two-way CTS/C (A→B), CTS/C (B→A) collision with a second cell, and a third cell is attempting to clear the first cell, the first cell can transmit anyway, if the deterministic two-way resolution between the first cell and second cell would allow the first cell to transmit. Because there is a non-zero probability that the third cell will not be able to transmit due to potential CTS/C packets from other cells, system capacity and fairness can be maximized by letting the first cell transmit. If this rule is adopted to resolve a collision where a cell is involved both in a two-way CTS/C collision and an incoming CTS/C collision, the result in the illustrated embodiment of FIG. 10 would be that either AP A would transmit data packet Tx A to UE A, or AP B would transmit data packet Tx B to UE B, based on the deterministic collision resolution between the cell of AP a and the cell of AP B.

In an embodiment of the invention, the use of CTS/C packets can be limited in order to increase the probability of channel reutilization in the system. In the embodiment, the amount of CTS/C packets is restricted by first defining a value $R_{min}$ as a target minimum rate for terminals at a cell edge for a specific traffic or service type. When a first receiver receives RTS packets from a first transmitter in its own cell, and other transmitters in the neighborhood, the first receiver evaluates the SINR level of the upcoming transmission. This evaluation is done by evaluating the relative power of the RTS packet received from the first transmitter in its own cell, and the relative powers of the RTS packets received from other transmitters in the neighborhood. If $R_{min}$ is supported by the estimated SINR, then the first receiver refrains from responding with a CTS/C packet, and instead responds with a CTS/R or CTS/N packet, which may include a CQI, where the CQI includes a proposed transmission format or expected SINR. If $R_{min}$ is not supported by the estimated SINR, then the first receiver responds with a CTS/C packet. The CTS/C packet can be a non-targeted CTS/C packet, or a targeted CTS/C packet, specifically addressing the transmitters that should be silent to avoid extra interference.

In an embodiment, the maximum number of transmitters to be silenced or restricted can be limited to N, which can be related to measurement capabilities or a number of available information elements in the CTS packet, or a combination of the two. It is important to note that a probability of CTS/C packet collisions decrease with a small value for N.

According to another embodiment, the first receiver can transmit the CTS/C packet, addressing up to N transmitters that should be silent, if and only if $R_{min}$ would be supported once they are removed. If $R_{min}$ would not be supported once they are removed, the first receiver does not transmit the CTS/C packet, and does not disturb other data packet transmissions.

In another embodiment, the policies to guide a node to determine proper CTS packet responses to incoming RTS packets can be determined by network configuration in a centralized or decentralized manner. The policies can be informed by higher layer signaling or negotiated among nodes in a neighborhood, and they can be changed to adapt to varying network conditions. Policies can also be determined by standards or independently configured by each node.

Figure 11:
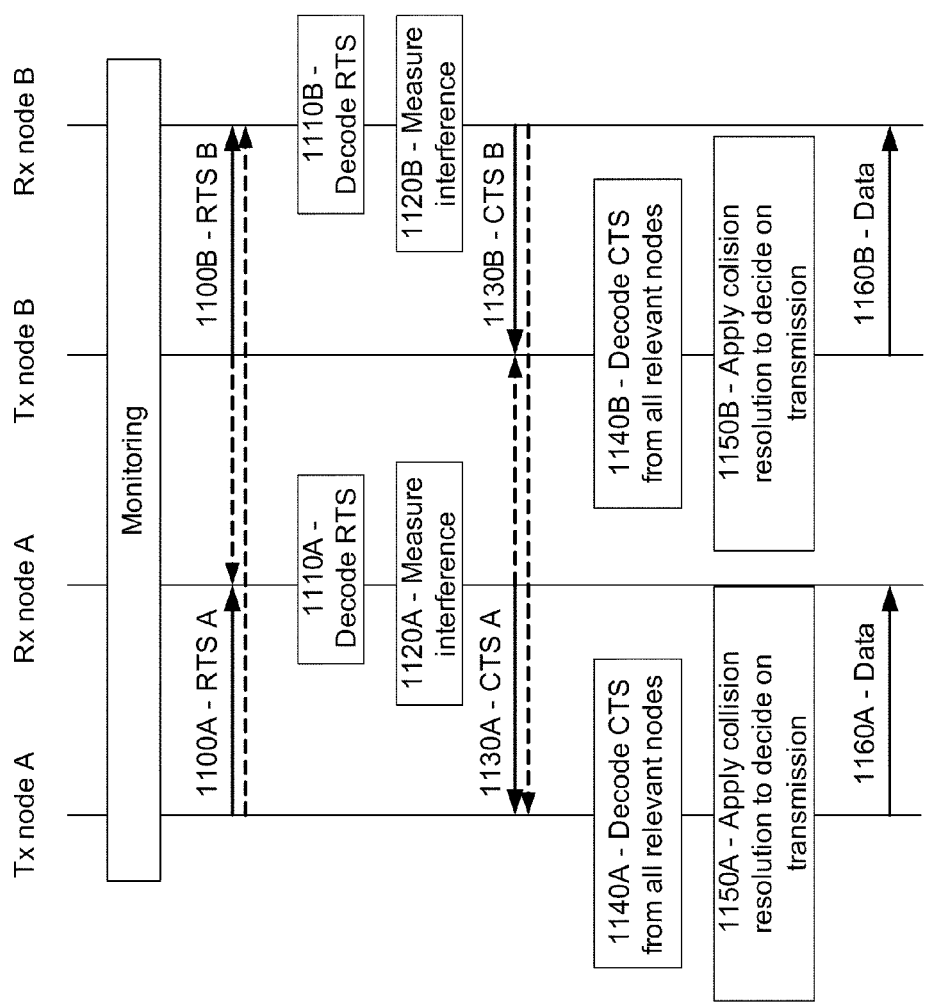
FIG. 11 illustrates a signaling flow according to an embodiment of the invention.

FIG. 11 illustrates a signaling flow according to an embodiment of the invention. The signaling flow includes a transmitting node A in a first cell, identified in FIG. 11 as "Tx Node A." The signaling flow also includes a receiving node A in the first cell, identified in FIG. 11 as "Rx Node A." The signaling flow also includes a transmitting node B in a second cell, identified in FIG. 11 as "Tx Node B." The signaling flow also includes a receiving node B in the second cell, identified in FIG. 11 as "Rx Node B."

According to the embodiment, Tx Node A, Rx Node A, Tx Node B, and Rx Node B each monitor the channels for packet transmissions. At 1100A, Tx Node A transmits packet RTS A to Rx Node A. Packet RTS A is forwarded to all neighboring nodes, including Tx Node B and Rx Node B. Simultaneously, at 1100B, Tx Node B transmits packet RTS B to Rx Node B. Packet RTS B is forwarded to all neighboring nodes, including Tx Node A and Rx Node A.

At 1110A, Rx Node A decodes packet RTS A. Likewise, at 1110B, Rx Node B decodes packet RTS B. At 1120A, Rx Node A measures the interference produced by Tx Node B and Rx Node B. Similarly, at 1120B, Rx Node B measures the interference produced by Tx Node A and Rx Node A.

At 1130A, Rx Node A transmits packet CTS A to Tx Node A. Packet CTS A is forwarded to all neighboring nodes, including Tx Node B and Rx Node B. Simultaneously, at 1130B, Rx Node B transmits packet CTS B to Tx Node B. Packet CTS B is forwarded to all neighboring nodes, including Tx Node A and Rx Node A.

At 1140A, Tx Node A decodes the received CTS packet from all relevant nodes. In this embodiment, Tx Node A decodes packet CTS A, received from Rx Node A, and decodes packet CTS B, received from Rx Node B. Likewise, at 1140B, Tx Node B decodes the received CTS packet from all relevant nodes. In this embodiment, Tx Node B decodes packet CTS B, received from Rx Node B, and decodes packet CTS A, received from Rx Node A.

At 1150A, Tx Node A applies collision resolution to decide whether to transmit a data packet. Similarly, at 1150B, Tx Node B applies collision resolution to decide whether to transmit a data packet. At 1160A, depending on the result of the collision resolution applied at 1150A, Tx Node A transmits a data packet to Rx Node A. Likewise, at 1160B, depending on the result of the collision resolution applied at 1150B, Tx Node B transmits a data packet to Rx Node B.

Below is an example logical collision resolution algorithm, according to an embodiment of the invention:
switch {own CTS}:
1) Case CTS/C. If other CTS type is:
   a. CTS/C: unresolved collision.
   b. Otherwise: transmit
2) Case CTS/C (B→x). If other CTS type is:
   a. CTS/C (y→B),
      If number of transmissions to be cleared by own CTS is larger than the number of transmissions to be cleared by other CTS, then transmit
      If number of transmissions to be cleared by own CTS is smaller than the number of transmissions to be cleared by other CTS, then do not transmit
      If number of transmissions to be cleared by own CTS is equal to the number of transmissions to be cleared by other CTS, then collision is unresolved.
   b. CTS/C (x→z).
      Transmit if the own CTS is imposing the highest number of clearings and restrictions. More generically, the packet with higher a*(# of clearings)+b*(# of restrictions) wins, where a and b are predefined constants. For example, with a=b=1, the packet imposing most clearing+restrictions wins.
      If number of clearings+restrictions is equal, there is an unresolved collision.
   c. CTS/R (y→B): transmit with one of the following options:
      The transmitter may obey the restriction indicated in the incoming CTS/R packet
      The transmitter B may ignore the incoming CTS/R packet and transmit according to the CQI indicated in the CTS packet from its own cell. This is the case, for example if x=y, since x will not be allowed to transmit anyway.
      The transmitter may obey the restriction indicated in the incoming CTS/R packet if this restriction, combined with the CQI information indicated in the own cell CTS packet, allows for a minimum service for the own cell receiver.
   Note: The selected option should take into account that own CTS/C packet is clearing channels in the neighborhood, and it may depend on type of restriction being requested.
   d. Other: transmit
3) Case CTS/R or CTS/R (B→x). If other CTS type is:
   a. CTS/C or CTS/C (y→B): do not transmit
   b. CTS/R or CTS/R (y→B): transmit with one of the following options:
      The transmitter may obey the restriction indicated in the incoming CTS/R packet
      The transmitter B may ignore the incoming CTS/R packet and transmit according to the CQI indicated in the CTS packet from its own cell
      The transmitter may obey the restriction indicated in the incoming CTS/R packet if this restriction, combined with the CQI information indicated in the own cell CTS packet, allows for a minimum service for the own cell receiver.
   c. Other: transmit
4) Case CTS/N. If other CTS type is:
   a. CTS/N: transmit
   b. CTS/R or CTS/R (y→B): transmit with one of the following options:
      The transmitter may obey the restriction indicated in the incoming CTS/R packet
      The transmitter B may ignore the incoming CTS/R packet and transmit according to the CQI indicated in the CTS packet from its own cell
      The transmitter may obey the restriction indicated in the incoming CTS/R packet if this restriction, combined with the CQI information indicated in the own cell CTS packet, allows for a minimum service for the own cell receiver.

c. Otherwise: do not transmit end

Below is an example algorithm for resolving unresolved collisions, according to an embodiment of the invention:

Never transmit, which corresponds to the situation when the collision would be on physical layer as in prior art systems with CTS;

Transmit depending on external variables such as the system frame number, the cell IDs, the IDs of the RTS/CTS channels, or a deterministic relation between the previous external variables;

Transmit depending on a random decision. The probability to transmit can depend on the probability of CTS/C transmissions, and can be a system parameter negotiated in the network neighborhood; or Transmit depending on the CQIs included in the CTS packets.

Below is an example refinement of the logical collision resolution algorithm previously described, for increased spectral efficiency:

2) CTS/C (B→xy). If other CTS packets include:

a. CTS/C (x→Bz). If number of clearings requested by own CTS is the same as number of clearings requested in incoming CTS/C packet i. Apply procedure for conflict resolution above between B and x, and ignore other CTS packets.

b. Otherwise: follow algorithm 1

The CTS packets can be arranged in three different ways according to different embodiments of the invention. In the first embodiment, the CTS channel that nodes in the cell are transmitting on can be cell-specific. This channel would be used both for information transmitted to the transmitter within the same cell of the receiver (e.g., CQI), and information to transmitters within other cells (e.g., clearings, restrictions). According to the first embodiment, the transmission to other cells can be identified by an ID.

In the second embodiment, the CTS channel where CTS packets intended for receivers in the cell can be cell-specific. In this embodiment, there can be physical layer collisions between transmissions from the cell of the receiver, and transmissions form other cells. In this embodiment, the cells transmitting restrictions or clearings can identify themselves.

In the third embodiment, there can be a cell-specific CTS channel for transmitting the parts of the CTS packets that are relevant for the transmitter in the cell of the receiver, such as CQI, and a cell-specific CTS channel for which transmitters from other cells may transmit clearing and restricting packets. On the latter, there can be physical collisions. The cells transmitting restrictions or clearing packets can identify themselves. One possible solution for collisions can be that a collision is observed as an incoming CTS channel with transmission power, but incoherent bits would be interpreted as a CTS/C packet.

In an embodiment, if the RTS/CTS packets are used in a framed system, where there is a semi-static or fixed slot structure, where some slots are intended for UL traffic, and some slots are intended for DL traffic, the RTS packet for a future DL slot can be embedded into a DL slot, such as a specific OFDM symbol of a DL slot. Likewise, the corresponding CTS packet can be embedded into the DL slot with a sufficient guard interval to switch between UL and DL, and sufficient processing time between the CTS packet and the beginning of the next DL slot, and a sufficient processing time between the RTS packet and the CTS packet. This also applies for RTS/CTS packets for future UL slots embedded into UL slots, or for future crossed slots where there is a possibility for DL transmission in one cell and possibility for an UL transmission in another cell.

In an embodiment where a transmitter or receiver (or both) are equipped with multiple antennas, precoding and multi-stream transmissions can be used to implement the RTS/CTS packet exchange. As an example, a RTS packet can be sent using an intended format for the receiver, so that other nodes in the neighborhood can evaluate the interference situation properly. This can be feasible if channel state information (CSI) is reliable, for example, if the current RTS/CTS packet exchange is part of an ongoing transmission. If CSI is not available, the RTS packet can be sent with a basic transmission format, and the RTS packet can explicitly inform if the intended transmission is multi-stream or prerecorded. In case of multi-stream RTS packet transmission, extra capacity can be used for an early start of actual data transmission. In this scenario, spare capacity in a CTS packet can be used for the corresponding acknowledgment.

In an embodiment utilizing precoding, a CTS packet can be precoded to an original transmitter, or otherwise be transmitted with a basic transmission format. The selection can be based on the type of CTS packet, as follows:

CTS/C and CTS/R (A)—basic transmission format, since these packets are intended for all other transmitters in the neighborhood;

CTS/N—either format can be used, since it is not critical if this CTS packet is decoded by other transmitters because it does not impose any restrictions, and precoding can be used to improve probability of reception. However, if other nodes apply the rule that incoherent bits in a colliding CTS packet are interpreted as a CTS/C packet, a basic transmission format can be favored in CTS/N packets as well; and CTS/C (A→B) and CTS/R (A→B)—precoded transmission can be used, provided that intended transmitters in other cells can be addressed by a precoder. For example, if a node transmitting the CTS packet has 4 transmitting antennas, it is capable of precoding the CTS packet to the intended node in cell A, as well as up to 3 other neighboring nodes. In an embodiment, the transmitter of the CTS packet can precode only to interferers, assuming that quality in the transmitter's own cell is adequate, and reception of CTS packet is not compromised by applied precoding weights.

Figure 12:
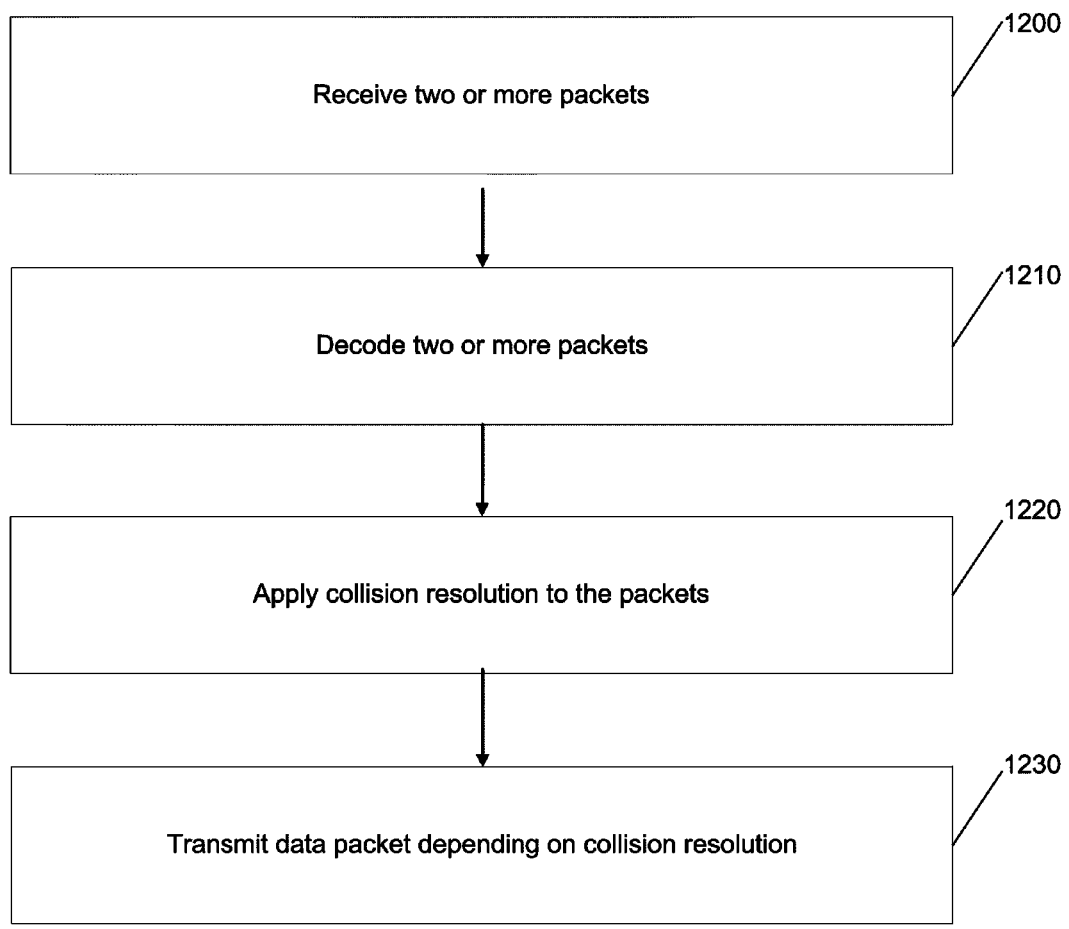
FIG. 12 illustrates a method according to an embodiment of the invention.

FIG. 12 illustrates a flow diagram of a method according to an embodiment of the invention. At step 1200, two or more packets are received. At step 1210, the two or more packets are decoded. At step 1220, a collision resolution is applied to the two or more packets to decide whether to transmit a data packet. At step 1230, the data packet is transmitted depending on a result of the collision resolution. In an embodiment, a packet comprises a CTS packet.

Figure 13:
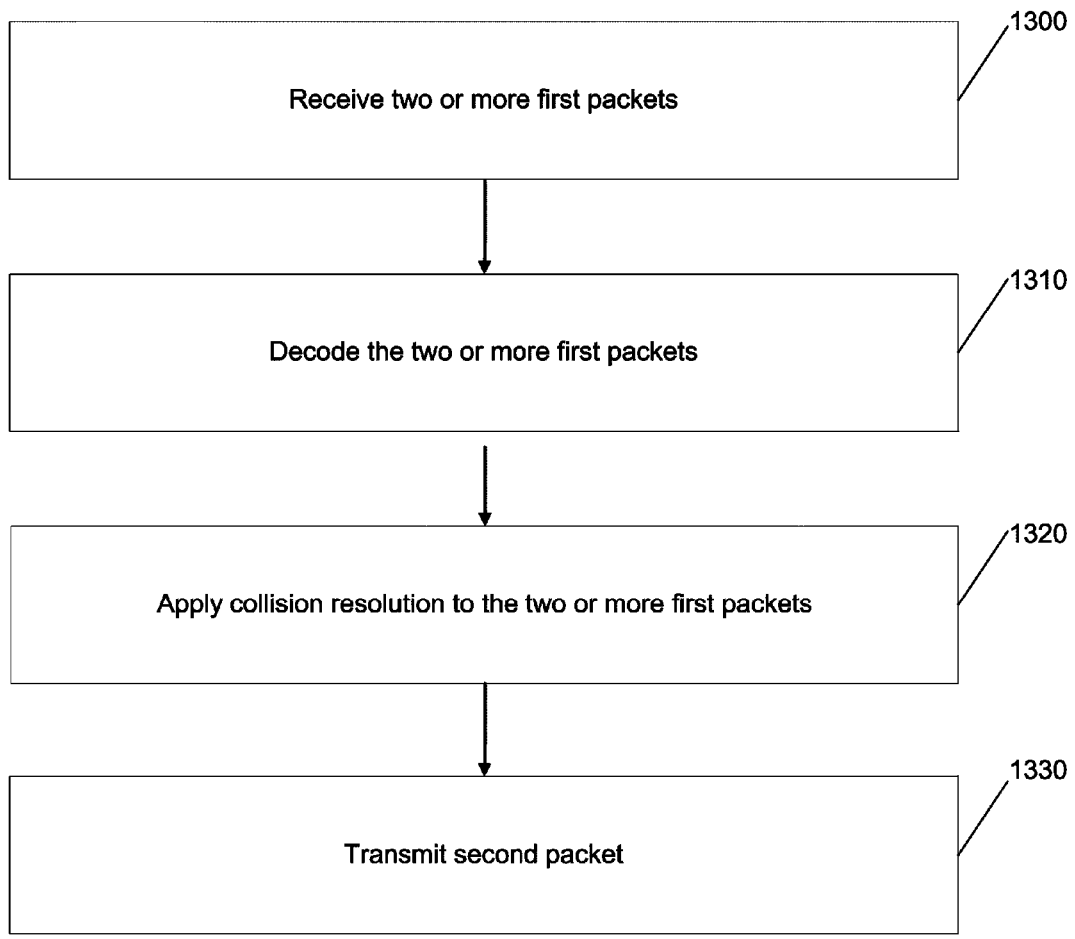
FIG. 13 illustrates a method according to another embodiment of the invention.

FIG. 13 illustrates a flow diagram of a method according to an embodiment of the invention. At step 1300, two or more first packets are received. At step 1310, the two or more first packets are decoded. At step 1320, a collision resolution is applied to the two or more first packets. At step 1330, a second packet is transmitted. In an embodiment, a first packet comprises a RTS packet, and a second packet comprises a CTS packet.

The steps of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory (RAM), flash memory, read-only memory (ROM), erasable programmable read-only memory (EPROM), electrically erasable programmable read-only memory (EEPROM), registers, hard disk, a removable disk, a compact disk read-only memory (CD-ROM), or any other form of storage medium known in the art. An exemplary storage medium may be coupled to the processor such that the processor can read information from, and write information to, the storage medium. In the alternative, the storage medium may be integral to the processor. The processor and the storage medium may reside in an application specific integrated circuit (ASIC). In the alternative, the processor and the storage medium may reside as discrete components.

Figure 14:
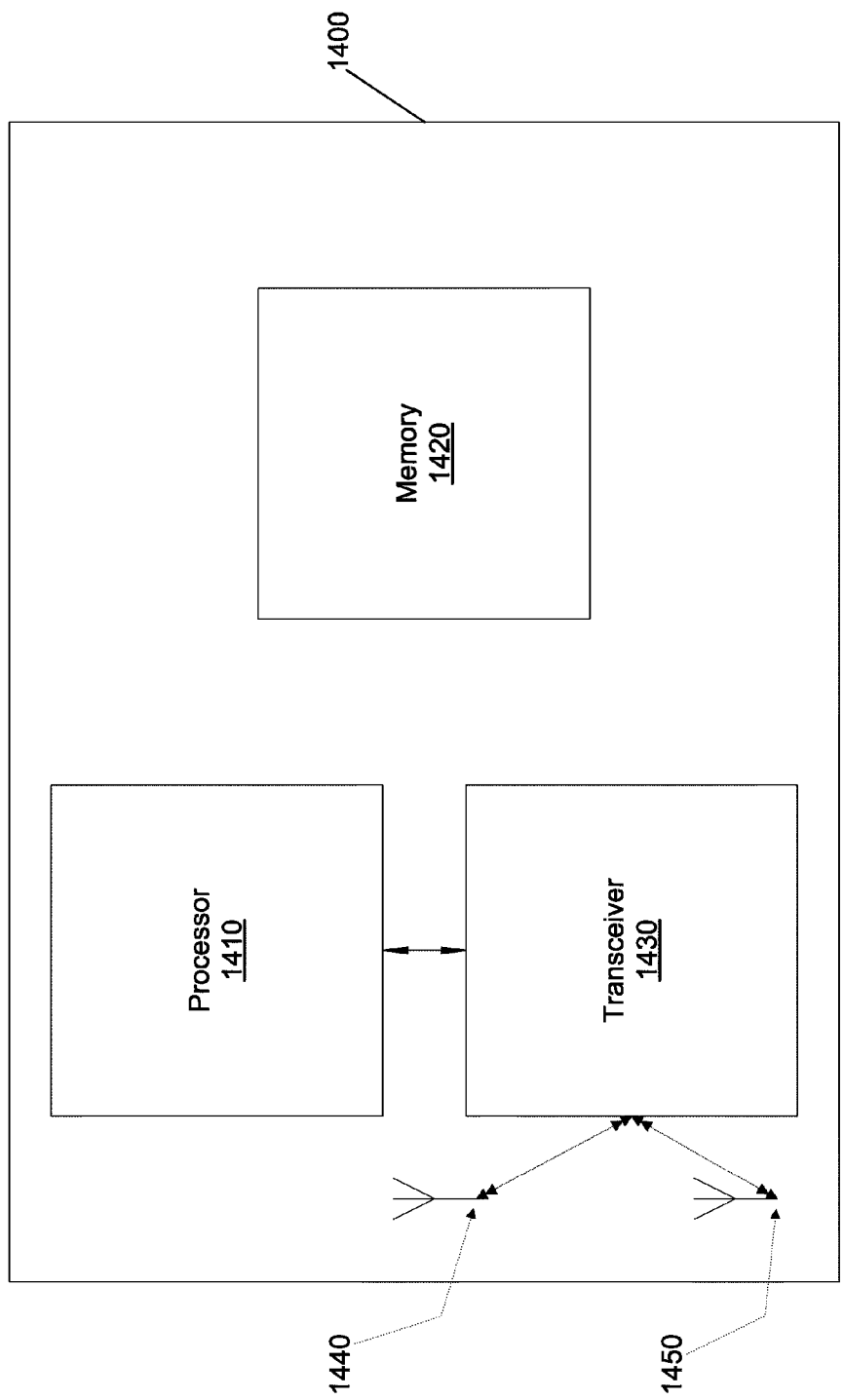
FIG. 14 illustrates an apparatus according to an embodiment of the invention.

FIG. 14 illustrates a block diagram of an apparatus 1400 according to one embodiment. Apparatus 1400 can include a processor 1410 and a memory 1420. Processor 1410 can read information from, and write information to, memory 1420. Processor 1410 can be a front end processor, a back end processor, a microprocessor, a digital signal processor, a processor with an accompanying digital signal processor, a special-purpose computer chip, a field-programmable gate array (FPGA), a controller, an ASIC, or a computer. Memory 1420 can be RAM, flash memory, ROM, EPROM, EEPROM, registers, hard disk, a removable disk, a CD-ROM, or any other form of storage medium known in the art. Memory 1420 can include computer program code. As one of ordinary skill in the art would readily appreciate, apparatus 1400 can include any number of processors in alternative embodiments. Likewise, apparatus 1400 can include any number of memories in alternative embodiments.

Apparatus 1400 can also include a transceiver 1430, which is configured to transmit and receive a packet, and which is connected to processor 1410. Apparatus 1400 can also include antennas 1440 and 1450, where each antenna is configured to assist transceiver 1430 in the transmitting and receiving of a packet. While the illustrated embodiment in FIG. 14 depicts two antennas, one of ordinary skill in the art would readily appreciate that apparatus 1400 can include any number of antennas in alternative embodiments. In an alternative embodiment, apparatus 1400 can include a single antenna.

In an embodiment, processor 1410 and memory 1420 can cause apparatus 1400 to receive two or more packets. Processor 1410 and memory 1420 can also cause apparatus 1400 to decode the two or more packets, apply a collision resolution to the two or more packets to decide whether to transmit a data packet, and transmit the data packet depending on the result of the collision resolution. In an embodiment, a packet comprises a CTS packet.

FIG. 15 illustrates a block diagram of an apparatus 1500 according to one embodiment. Apparatus 1500 can include a processor 1510 and a memory 1520. Processor 1510 can read information from, and write information to, memory 1520. Processor 1510 can be a front end processor, a back end processor, a microprocessor, a digital signal processor, a processor with an accompanying digital signal processor, a special-purpose computer chip, a FPGA, a controller, an ASIC, or a computer. Memory 1520 can be RAM, flash memory, ROM, EPROM, EEPROM, registers, hard disk, a removable disk, a CD-ROM, or any other form of storage medium known in the art. Memory 1520 can include computer program code. As one of ordinary skill in the art would readily appreciate, apparatus 1500 can include any number of processors in alternative embodiments. Likewise, apparatus 1500 can include any number of memories in alternative embodiments.

Apparatus 1500 can also include a transceiver 1530, which is configured to transmit and receive a packet, and which is connected to processor 1510. Apparatus 1500 can also include antennas 1540 and 1550, where each antenna is configured to assist transceiver 1530 in the transmitting and receiving of a packet. While the illustrated embodiment in FIG. 15 depicts two antennas, one of ordinary skill in the art would readily appreciate that apparatus 1500 can include any number of antennas in alternative embodiments. In an alternative embodiment, apparatus 1500 can include a single antenna.

In an embodiment, processor 1510 and memory 1520 can cause apparatus 1500 to receive two or more first packets and decode the two or more first packets. Processor 1510 and memory 1520 can also cause apparatus 1500 to apply a collision resolution to the two or more first packets and transmit a second packet. In an embodiment, a first packet comprises an RTS packet, and a second packet comprises a CTS packet.

Thus, according to an embodiment of the invention, a more efficient utilization of resources in a multi-cell system can be provided. A receiver that is a victim of high interference levels can request interference-free channels in order to achieve a QoS target defined by the system. Likewise, a node with a good connection with its neighbors can allow a wireless channel to be reused by other nodes in the neighborhood.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:

receiving two or more packets;

decoding the two or more packets;

applying a collision resolution to the two or more packets to decide whether to transmit a data packet; and transmitting the data packet based on a result of the collision resolution, wherein each packet comprises a clear-to-send packet, wherein the applying the collision resolution to the two or more clear-to-send packets further comprises giving priority to the clear-to-send packets that comprise clear-to-send clear packets, wherein the applying the collision resolution to the two or more clear-to-send packets further comprises giving priority to the clear-to-send packets requesting to clear the highest number of data packet transmissions, and wherein the applying the collision resolution to the two or more clear-to-send packets further comprises:

giving priority to the clear-to-send packets requesting to impose the highest number of clearings and restrictions, using the formula, $$\text{number of clearings and restrictions} = (a * \text{number of clearings}) + (b * \text{number of restrictions}),$$

wherein a and b are pre-defined constants.

2. The method of claim 1, wherein the applying the collision resolution to the two or more clear-to-send packets further comprises:

determining that at least one of the two or more clear-to-send packets is a clear-to-send restriction packet; and one of,
   obeying the restriction indicated in the clear-to-send restriction packet,
   ignoring the restriction indicated in the clear-to-send restriction packet and transmitting the data packet according to channel quality indicator information in a clear-to-send packet of the two or more clear-to-send packets, or
   obeying the restriction indicated in the clear-to-send restriction packet, if the restriction combined with channel quality indicator information in a clear-to-send packet of the two or more clear-to-send packets, allows for a minimum service for transmitting the data packet.

3. The method of claim 2, wherein the applying the collision resolution to the two or more clear-to-send packets further comprises:
   determining that at least two clear-to-send packets of the two or more clear-to-send packets comprise clear-to-send clear packets;
   determining that the at least two clear-to-send packets of the two or more clear-to-send packets result in an unresolved collision; and
   one of,
      failing to transmit the data packet,
      transmitting the data packet based on external variables,
      transmitting the data packet based on a random decision, or
      transmitting the data packet based on channel quality indicator information included in the two or more clear-to-send packets.

4. The method of claim 3, wherein the external variables comprise at least one of,
   a system frame number,
   an identity of a cell,
   an identity of channels of the two or more clear-to-send packets, or
   a deterministic relation between two or more of the system frame number, the identity of the cell, the identity of channels of the two or more clear-to-send packets.

5. The method of claim 3, wherein the applying the collision resolution to the two or more clear-to-send packets further comprises:
   determining that at least three clear-to-send packets of the two or more clear-to-send packets comprise clear-to-send clear packets;
   determining that at least two clear-to-send clear packets of the two or more clear-to-send packets comprise a same number of requested clearings; and
   applying the collision resolution to the at least two clear-to-send clear packets and ignoring the other clear-to-send packets.

6. The method of claim 1, wherein the transmitting, receiving, decoding, and applying are performed at one of an access point or a user equipment.

7. A method, comprising:
   receiving two or more first packets;
   decoding the two or more first packets;
   measuring interference of the two or more first packets;
   applying a collision resolution to the two or more first packets to decide a type of second packet to transmit based, at least in part, on the measured interference of the two or more first packets; and
   transmitting a second packet of the decided type based on the collision resolution,
   wherein each first packet comprises a request-to-send packet, and the second packet comprises a clear-to-send packet,
   wherein the clear-to-send packet comprises one of, a clear-to-send clear packet, a clear-to-send restrict packet, or a clear-to-send non-restrict packet, and
   wherein the clear-to-send restrict packet comprises one of, a proposed transmission format, or a signal-to-interference ratio estimate that takes into account a restriction of the clear-to-send restrict packet.

8. The method of claim 7, wherein applying the collision resolution to the two or more request-to-send packets further comprises measuring interference of the two or more request-to-send packets and determining a type of the clear-to-send packet based on the measured interference of the two or more request-to-send packets.

9. The method of claim 7, wherein the clear-to-send packet comprises channel quality indicator information.

10. The method of claim 7, wherein the clear-to-send packet comprises a targeted clear-to-send packet.

11. The method of claim 7, wherein the receiving, decoding, applying, and transmitting are performed at one of a user equipment or an access point.

12. An apparatus, comprising:
   a processor; and
   a memory comprising computer program code,
   the memory and the computer program code configured to, with the processor, cause the apparatus to
      receive two or more packets,
      decode the two or more packets,
      apply a collision resolution to the two or more packets to decide whether to transmit a data packet, and
      transmit the data packet based on a result of the collision resolution,
   wherein each packet comprises a clear-to-send packet,
   wherein the memory and the computer program code are further configured to, with the processor, cause the apparatus to give priority to the clear-to-send packet that comprises a clear-to-send clear packet,
   wherein the memory and the computer program code are further configured to, with the processor, cause the apparatus to give priority to the clear-to-send packet requesting to clear the highest number of data packet transmissions, and
   wherein the memory and the computer program code are further configured to, with the processor, cause the apparatus to:
   give priority to the clear-to-send packet requesting to impose the highest number of clearings and restrictions, using the formula, number of clearings and restrictions=($a$*number of clearings)+($b$*number of restrictions), wherein a and b are pre-defined constants.

13. The apparatus of claim 12, wherein the memory and the computer program code are further configured to, with the processor, cause the apparatus to:
   determine that at least one of the two or more clear-to-send packets is a clear-to-send restriction packet; and
   one of,
      obey the restriction indicated in the clear-to-send restriction packet,
      ignore the restriction indicated in the clear-to-send restriction packet and transmit the data packet according to channel quality indicator information in a clear-to-send packet of the two or more clear-to-send packets, or obey the restriction indicated in the clear-to-send restriction packet, if the restriction combined with channel quality indicator information in a clear-to-send packet of the two or more clear-to-send packets, allows for a minimum service for transmitting the data packet.

14. The apparatus of claim 13, wherein the memory and the computer program code are further configured to, with the processor, cause the apparatus to:
determine that at least two clear-to-send packets of the two or more clear-to-send packets comprise clear-to-send clear packets;
determine that the at least two clear-to-send packets of the two or more clear-to-send packets result in an unresolved collision; and
one of,
fail to transmit the data packet,
transmit the data packet based on external variables,
transmit the data packet based on a random decision, or
transmit the data packet based on channel quality indicator information included in the two or more clear-to-send packets.

15. The apparatus of claim 14, wherein the external variables comprise at least one of,
a system frame number,
an identity of a cell,
an identity of channels of the two or more clear-to-send packets, or
a deterministic relation between two or more of the system frame number, the identity of the cell, the identity of channels of the two or more clear-to-send packets.

16. The apparatus of claim 14, wherein the memory and the computer program code are further configured to, with the processor, cause the apparatus to:
determine that at least three clear-to-send packets of the two or more clear-to-send packets comprise clear-to-send clear packets;
determine that at least two clear-to-send clear packets of the two or more clear-to-send packets comprise a same number of requested clearings; and
apply the clear-to-send collision resolution to the at least two clear-to-send clear packets and ignore the other clear-to-send packets.

17. The apparatus of claim 12, wherein the apparatus comprises an access point.

18. An apparatus, comprising:
a processor; and
a memory comprising computer program code,
the memory and the computer program code configured to, with the processor, cause the apparatus to
receive two or more first packets,
decode the two or more first packets,
measure interference of the two or more first packets,
apply a collision resolution to the two or more first packets to decide a type of second packet to transmit based, at least in part, on the measured interference of the two or more first packets, and
transmit a second packet of the decided type based on the collision resolution,
wherein each first packet comprises a request-to-send packet, and wherein the second packet comprises a clear-to-send packet,
wherein the clear-to-send packet comprises one of, a clear-to-send clear packet, a clear-to-send restrict packet, or a clear-to-send non-restrict packet, and
wherein the clear-to-send restrict packet comprises one of a proposed transmission format, or a signal-to-interference ratio estimate that takes into account a restriction of the clear-to-send restrict packet.

19. The apparatus of claim 18, wherein the memory and the computer program code are further configured to, with the processor, cause the apparatus to measure interference of the two or more request-to-send packets and determine a type of the clear-to-send packet based on the measured interference of the two or more request-to-send packets.

20. The apparatus of claim 18, wherein the clear-to-send packet comprises channel quality indicator information.

21. The apparatus of claim 18, wherein the clear-to-send packet comprises a targeted clear-to-send packet.

22. The apparatus of claim 18, wherein the apparatus comprises a user equipment.

23. A non-transitory computer readable medium having a computer program stored thereon that, when executed by a processor, causes the processor to implement a method, the method comprising:
receiving two or more packets;
decoding the two or more packets;
applying a collision resolution to the two or more packets to decide whether to transmit a data packet; and
transmitting the data packet based on a result of the collision resolution,
wherein each packet comprises a clear-to-send packet,
wherein the applying the collision resolution to the two or more clear-to-send packets further comprises giving priority to the clear-to-send packets that comprise clear-to-send clear packets,
wherein the applying the collision resolution to the two or more clear-to-send packets further comprises giving priority to the clear-to-send packets requesting to clear the highest number of data packet transmissions, and
wherein the applying the collision resolution to the two or more clear-to-send packets further comprises:
giving priority to the clear-to-send packets requesting to impose the highest number of clearings and restrictions, using the formula, number of clearings and restrictions=($a$*number of clearings)+($b$*number of restrictions), wherein a and b are pre-defined constants.

24. A non-transitory computer readable medium having a computer program stored thereon that, when executed by a processor, causes the processor to implement a method, the method comprising:
receiving two or more first packets;
decoding the two or more first packets;
measuring interference of the two or more first packets;
applying a collision resolution to the two or more first packets to decide a type of second packet to transmit based, at least in part, on the measured interference of the two or more first packets; and
transmitting a second packet of the decided type based on the collision resolution,
wherein each first packet comprises a request-to-send packet, and the second packet comprises a clear-to-send packet,
wherein the clear-to-send packet comprises one of, a clear-to-send clear packet, a clear-to-send restrict packet, or a clear-to-send non-restrict packet, and
wherein the clear-to-send restrict packet comprises one of, a proposed transmission format, or a signal-to-interference ratio estimate that takes into account a restriction of the clear-to-send restrict packet.

* * * * *